(12) United States Patent
Marko et al.

(10) Patent No.: US 9,600,573 B2
(45) Date of Patent: Mar. 21, 2017

(54) SYSTEMS AND METHODS FOR IMPLEMENTING DYNAMIC BANKS OF SUBCHANNELS FOR BROADCAST OR STREAMED CONTENT SERVICES FEATURED FAVORITES

(71) Applicant: Sirius XM Radio Inc., New York, NY (US)

(72) Inventors: Paul Marko, Pembroke Pines, FL (US); Stuart A. Cox, Boca Raton, FL (US); Craig Wadin, Sunrise, FL (US)

(73) Assignee: Sirius XM Radio Inc., New York, NY (US)

( * ) Notice: Subject to any disclaimer, the term of this patent is extended or adjusted under 35 U.S.C. 154(b) by 245 days.

(21) Appl. No.: 14/155,296

(22) Filed: Jan. 14, 2014

(65) Prior Publication Data

US 2014/0129016 A1    May 8, 2014

Related U.S. Application Data

(63) Continuation-in-part of application No. PCT/US2012/046971, filed on Jul. 16, 2012.
(Continued)

(51) Int. Cl.
*G06F 17/00* (2006.01)
*G06F 17/30* (2006.01)
(Continued)

(52) U.S. Cl.
CPC ....... *G06F 17/30769* (2013.01); *H04H 60/25* (2013.01); *H04H 60/46* (2013.01);
(Continued)

(58) Field of Classification Search
CPC .............................. H04H 20/33; H04H 60/25
See application file for complete search history.

(56) References Cited

U.S. PATENT DOCUMENTS

2004/0221306 A1    11/2004  Noh
2007/0192800 A1     8/2007  Walter et al.
(Continued)

FOREIGN PATENT DOCUMENTS

KR    10-2007-0041295 A    1/2007

OTHER PUBLICATIONS

International Search Report Application No. PCT/US2012/046971, Application Filing Date Jul. 16, 2012, Date of Mailing Jan. 10, 2013.

*Primary Examiner* — Joseph Saunders, Jr.
(74) *Attorney, Agent, or Firm* — Kramer Levin Naftalis & Frankel LLP

(57) ABSTRACT

Systems and methods are presented for a broadcast or streamed content receiver to receive a plurality of program channels with defined banks of subset channels, to display the banks on the radio receiver, and to receive dynamic updates of both channels within the banks and the content of each such channel. In exemplary embodiments of the present invention, the channels in a given bank can be determined by commonality as to defined categories, user interest, user preferences, and/or content provider, or seasonal or other relevance. In exemplary embodiments of the present invention, channels in one or more defined banks can be buffered to facilitate smart user scanning within such defined banks, or one or more banks can be used to generate a bank specific "TuneMix™" channel.

20 Claims, 31 Drawing Sheets

Related U.S. Application Data

(60) Provisional application No. 61/572,332, filed on Jul. 14, 2011, provisional application No. 61/786,305, filed on Mar. 15, 2013.

(51) Int. Cl.
| | | |
|---|---|---|
| *H04H 60/25* | (2008.01) | |
| *H04H 60/46* | (2008.01) | |
| *H04H 60/65* | (2008.01) | |
| *H04H 60/73* | (2008.01) | |
| *H04H 20/26* | (2008.01) | |

(52) U.S. Cl.
CPC ............ *H04H 60/65* (2013.01); *H04H 60/73* (2013.01); *H04H 20/26* (2013.01)

(56) References Cited

U.S. PATENT DOCUMENTS

2008/0244641 A1   10/2008  Ho et al.
2009/0221248 A1*  9/2009   Ellis ...................... H04H 20/40
                                                             455/132

\* cited by examiner

FIG. 2 – End-to-end delivery
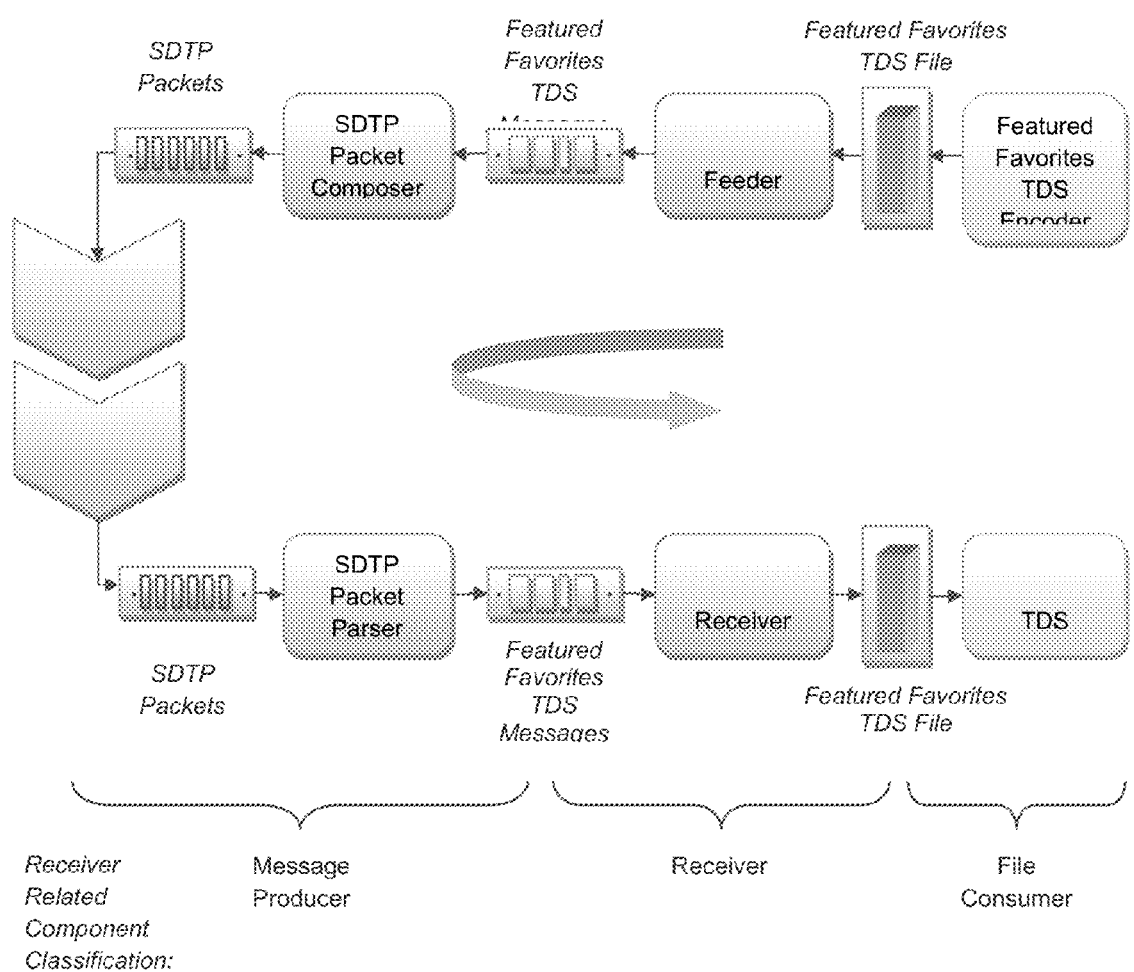

TDS Message Framing

SDTP Packet Multiplexing

SYSTEMS AND METHODS FOR IMPLEMENTING DYNAMIC BANKS OF SUBCHANNELS FOR BROADCAST OR STREAMED CONTENT SERVICES FEATURED FAVORITES

CROSS-REFERENCE TO RELATED APPLICATIONS

This application is a continuation-in-part of PCT application PCT/US2012/046971, filed on Jul. 16, 2012, and which published as WO/2013/010186, and which itself claims the benefit of U.S. Provisional Patent Application No. 61/572,332, filed on Jul. 14, 2011. This application also claims the benefit of U.S. Provisional Patent Application No. 61/786,305, filed on Mar. 15, 2013. Related subject matter is also disclosed and claimed in PCT/US2012/025091. The entire contents of each of those applications is hereby incorporated by reference, as well as any documents incorporated in either of those PCT applications by reference. Finally, U.S. patent application Ser. No. 13/531,440, now published as US 2013/003993, known as the "Tune Mix" application, is also hereby incorporated by reference, as well as any documents incorporated in it.

TECHNICAL FIELD

The present application relates to broadcast and receiver technology, and in particular to systems and methods for implementing and supporting user preference selected and dynamically updated banks of channels, thus providing a user with easier access to content of specific interest.

BACKGROUND OF THE INVENTION

Broadcast or streaming audio content delivery systems, such as, for example, Sirius XM Radio or the like, offer numerous channels of content to users. In general, although some effort is made to group channels of similar content in banks or bands, users with varied and eclectic tastes will often end up listening to a subset of channels spread across the entire available channel lineup.

For example, in the XM digital satellite radio service, the following is the channel lineup as of March, 2012:

Channel Number—Channel Name
2—Sirius XM Hits 1
3—Top 20 on 20
4—40s on 4
5—50s on 5
6—60s on 6
7—70s on 7
8—80s on 8
9—90s on 9
10—The Pulse
11—KIIS-FM
12—Z-100
13—LITE-FM
14—Pop 2K
15—Studio 54 Radio
16—The Blend
17—Sirius XM Love
18—Limited Engagements
19—Elvis Radio
20—E Street Radio
21—Underground Garage
22—Pearl Jam Radio
23—Grateful Dead Channel
24—Radio Margaritaville
25—Classic Rewind
26—Classic Vinyl
27—Deep Tracks
28—The Spectrum
29—Jam On
30—The Loft
31—The Coffee House
32—The Bridge
33—1st Wave
34—Lithium
35—Sirius XMU
36—Alt Nation
37—Octane
38—Boneyard
39—Hair Nation
40—Liquid Metal
41—Faction
42—The Joint
44—HipHop Nation
45—Shade 45
46—Backspin
47—The Heat
48—Heart and Soul
49—Soul Town
50—The Groove
51—BPM
52—Electric Area
53—Sirius XM Chill
56—Willies Roadhouse
57—Nashville
58—Prime Country
59—The Highway
60—Outlaw Country
61—Bluegrass Junction
63—The Message
64—Praise
66—Watercolors
67—Real Jazz
68—Spa
69—Escape
70—BB Kings Bluesville
71—Siriusly Sinatra
72—On Broadway
74—Met Opera Radio
75—Sirius XM Pops
76—Symphony Hall
78—Kids Place Live
79—Radio Disney
80—Book Radio
81—Doctor Radio
82—Radio Classics
84—ESPN Radio
85—ESPN Xtra
86—Mad Dog Radio
87—Fantasy Sports Radio
88—NFL Radio*
89—MLB Network Radio
90—NASCAR Radio*
91—College Sports Nation
92—NHL Home Ice
93—PGA Tour Network
94—IZOD Indy Car
96—Laugh USA
97—Blue Collar Radio
98—The Foxxhole
99—Raw Dog Comedy 100—Howard 100*
101—Howard 101*
102—Playboy Radio*
103—Spice Radio*
104—Sirius XM Stars Too
105—The Virus
106—Road Dog Trucking
107—Sirius XM Stars
108—OutQ
109—COSMO Radio
110—Martha Stewart Radio*
111—Oprah Radio
112—CNBC
113—Bloomberg Radio
114—FOX News
115—CNN
116—HLN
117—MSNBC
118—BBC World Service
119—C-SPAN Radio
120—WRN
121—Sirius XM Public Radio
122—NPR Now
123—PRX
124—POTUS
125—Sirius XM Patriot
126—FOX News Radio
127—Sirius XM Left
128—The Power
129—Catholic Channel
131—Family Talk
132—BOS/PHI/PIT
133—NY
134—DC/BAL/ATL
135—CHI/DET
136—MIA/TB
137—DFW/HOU/PHX
138—STL/MSP/LSV
139—SF/SEA/SDG
140—LA
141—HUR Voices
143—BYU Radio
144—Korea Today
145—Inspirate
146—Cristina Radio
147—En Vivo
148—CNN en Espanol
149—ESPN Deportes Radio
150—Caliente
151—The Verge
152—Air Musique
153—Sur La Route
154—XM Scoreboard
155—Canada 360
156—Radio Parallele
157—Calendrier Sportif
158—Quoi de Neuf
159—ATN
163—WCGI-FM
160—Laugh Attack
164—Sixx Sense
165—Extreme Talk
166—Americas Talk
167—ReachMD
168—TALK Radio
169—FOX Sports Radio
175—MLB en Espanol
176-189 MLB Play by Play Channels
190-210 Play by Play Channels
212-222 NHL Play by Play Channels
225-239 Premier Play by Play Channels (NFL, NCAA, Nascar)*
Xtra Channels:**
310—Rock and Roll Hall of Frame Radio (Xtra Channel)**
313—RockBar (Xtra Channel)**
316—Sirius XM Comes Alive (Xtra Channel)**
319—Classic College Radio (Xtra Channel)**
340—Tiesto's Club Life Radio (Xtra Channel)**
350—Red White & Booze (Xtra Channel)**
360—Yoga (Xtra Channel)**
370—SportsCenter (Xtra Channel)**
400—Carlin's Corner (Xtra Channel)**
403—Dirty Dog (Xtra Channel)**
406—UCB Radio (Xtra Channel)**
500—Viva (Xtra Channel)**
503—La Mezcla (Xtra Channel)**
506—Flow Nación (Xtra Channel)**
510—Aguila (Xtra Channel)**
520—Latidos (Xtra Channel)**
523—Caricia (Xtra Channel)**
530—Luna (Xtra Channel)**
533—Rumbón (Xtra Channel)**
540—La Kueva (Xtra Channel)**
560—RadioFórmula México (Xtra Channel)**
569—Playboy Radio en Espanol (Xtra Channel)**
*=Requires XM Premier subscription
=Requires Xtra-compatible radio, such as the XM Edge As can readily be seen, with over 170 channels, individual users may regularly listen to one or two channels from each band of channels, such as, for example, 80s on 8, 90s on 9, Deep Tracks 27, The Joint 42, BBC World Service 118, Oprah Radio 111, C-Span 119, and Laugh Attack 160**. These regularly used channels are spread across the entire 170+ spectrum of channels.

In a typical use of a radio receiver capable of receiving multiple channels, such as an XM capable satellite radio receiver, a content provider may assign featured channels to a set of preset channels, so that a particular channel can be quickly selected by a user for live play by simply selecting from a menu of such preselected channels. While this menu of preselected channels ("channel bank") can provide a wide assortment of channels, it (i) is generally infrequently refreshed to reflect the latest lineup changes, (ii) fails to consider user preferences, or (iii) fails to update based on seasonal or promotional periods. If there is no subset of desired channels, the user is then forced to search for channels. Although, as noted, channels may be grouped together by category, a user still must perform an extra step of searching through uninteresting channels to find his or her personal "wheat amongst the chaff."

In most receivers, a user may select certain channels as favorites for ease of access. However, such a user may not be aware of certain promotional/season events/channels, new channels, or other channels of interest without having to search the full list of channels.

What is thus needed in the art are convenient methods and apparatus for providing a user with the channels he or she genuinely wishes to listen to without requiring that he or she to search for them across an ever expanding spectrum of available channels.

SUMMARY OF THE INVENTION

In exemplary embodiments of the present invention, a significant improvement to the listening experience can be facilitated via a radio receiver, or other user device, by providing the user with a dynamically updated bank of channels. Such a channel bank can provide the user with easier access to content of interest, and can, for example, be based on (i) user selections of one or more channels in a favorites list, or for example, (ii) promotional information. A new bank of channels can, for example, also list other topically related channels that the user may enjoy. For example, during the December holiday season, a "Holiday" themed favorites bank can be defined to include channels then currently playing holiday music, such as, for example, "Holiday Traditions", "Country Christmas", "Radio Hanukkah", and "Holiday Pops" named/themed channels. Because such channels are seasonal, only temporarily play holiday content, and can often be spread across an entire multi-channel broadcast offering, they are often hard for a user to find, particularly in an automotive driving environment. By providing them all in one bank, they can easily be located and enjoyed.

In exemplary embodiments of the present invention a user can also be provided with a dynamically updated "getting started" bank. Such a bank can be specifically designed to assist new users or attract new users in finding appealing content, targeting a specific demographic or topical interest. For example, if it is known that a user is a sports fan who attended a particular university, a sports themed bank of channels could contain those channels carrying the collegiate conference games of the user's alma matter.

In exemplary embodiments of the present invention a user can have the ability to initiate a content scanning operation within a Featured Favorites bank whereby tracks (e.g., songs, news/talk segments, etc.) previously aired and buffered for a plurality of designated channels can be played in succession from start through a few seconds for each track (or optionally live for certain designated channels), until the user halts such scanning and listens to the full track where the user stopped the scanning.

Finally, the Featured Favorites data transmission service can be used to support "TuneMix" functionality. In particular, an exemplary Featured Favorites service can be used to transmit a list of channels which, when received by the receiver, can be used to construct a TuneMix channel comprising the channels in the list. This can be done, for example, using a is a bitfield called "Purpose" associated with each transmitted channel list in Featured Favorites. For example, one bit can represent "Convenience", meaning that the list is to be displayed as a Featured Favorites bank from which the user can conveniently access the channels in the list (already covered in the FF patent application). In addition, an exemplary system may furthermore designate a separate bit in the Purpose field to mean "TuneMix", meaning the receiver should instead use the channel list to construct a TuneMix channel.

An exemplary Featured Favorites service can also optionally include a Channel ID with the list, so that the constructed TuneMix channel receives a "viritual channel ID" so that it can then be tuned just like a normal broadcast channel by the user.

BRIEF DESCRIPTION OF THE DRAWINGS

The above and other aspects of the invention, its nature, and various features will become more apparent upon consideration of the following detailed description, taken in conjunction with the accompanying drawings, in which like reference characters may refer to like parts throughout, and in which:

FIG. 2 depicts exemplary end-to-end delivery of exemplary Featured Favorite TDS files and messages content in accordance with an exemplary embodiment of the present invention;

DETAILED DESCRIPTION OF THE INVENTION

Figure 1:
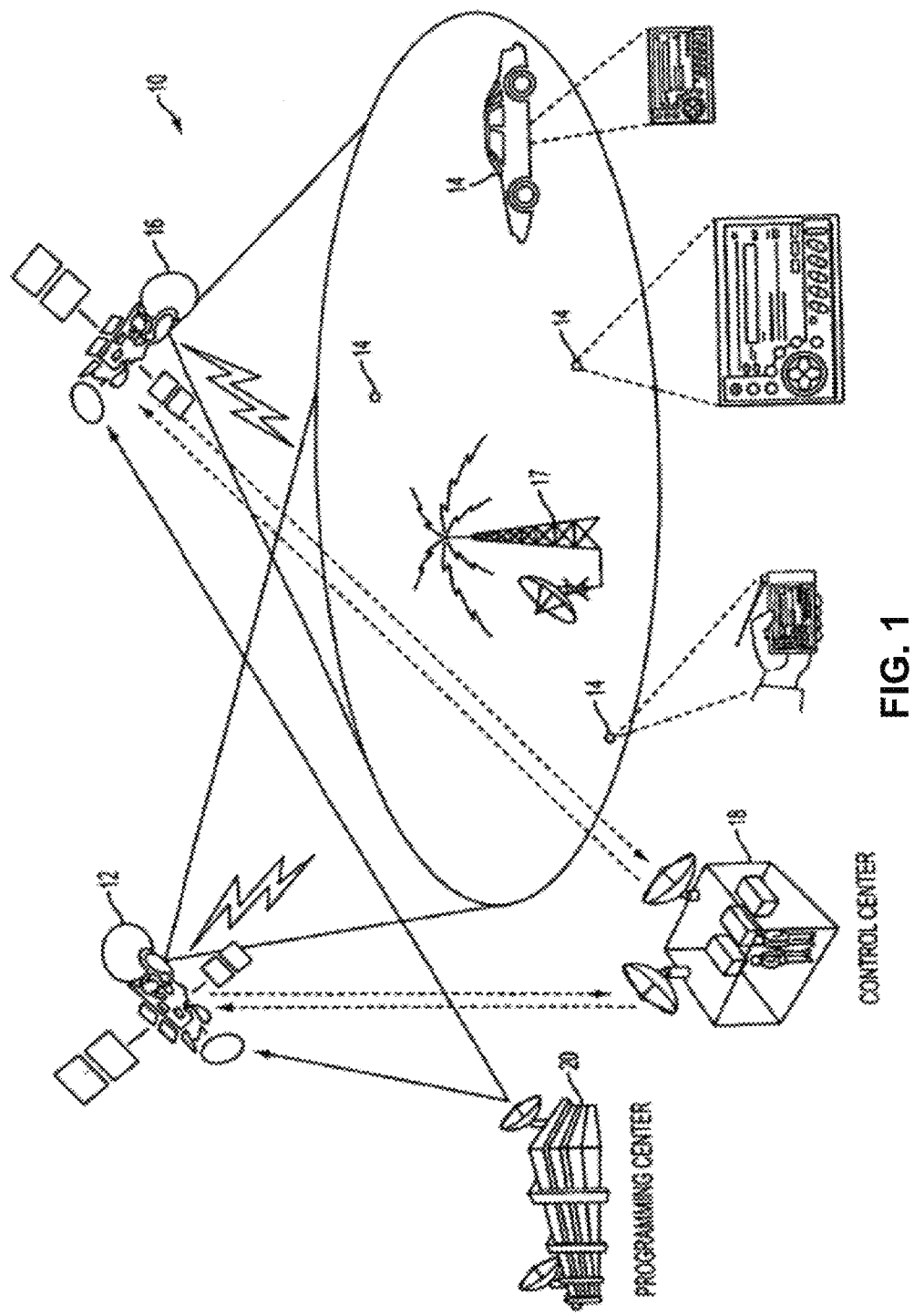
FIG. 1 depicts an example of a broadcast or streamed content delivery system in accordance with an exemplary embodiment of the present invention.

Exemplary embodiments of the present invention relate to an operation of a broadcast or streamed content receiver that provides an ordered subset of channels that can be updated dynamically to provide a user with an aggregation of topically related channels and can be based on a user's preferences. The feature is sometimes hereinafter referred to as "Featured Favorites."

In a radio receiver or other device capable of receiving multiple broadcast or streamed content channels, each channel can be aggregated into a set of groups (based on some identified commonality, such as, for example, musical genre, sporting event, news, etc.). Because the content of the respective channels in broadcast or streamed content transmissions is varied and numerous, it may be advantageous for a user to select a set of channels and place them in a favorites list for ease of access. For example, a user may prefer certain channels that feature a similar musical genre such as, for example, AltNation or Sirius XMU. By selecting such channels as favorites, a user can more easily select a channel from a subset of channels.

Several exemplary embodiments according to the present invention are described herein. Briefly, a radio receiver or other user device can be configured for Featured Favorites operation that enables it to receive at least one broadcast stream or streamed content (e.g., metadata, audio, and/or video) that comprises a plurality of different content channels. The radio receiver can designate a bank that includes a channel or multiple channels from among the plurality of broadcast or streamed channels, and can list the designated channel(s) from the user interface. The user interface can, for example, include a physical button on the radio receiver interface, or in a menu interface, by which a user can access such designated channels.

A Featured Favorites operation can avoid limitations of services and products that seek to provide a user with a static or predetermined list of channels without any dynamically updated content that the user might enjoy. An exemplary Featured Favorites operation can further avoid the disadvantages of attempts to promote certain channels without consideration of the individual user's preferences. Featured Favorites can thus provide an optimal balance of content promotion and user personalization, which is a particularly useful functionality for products that feature a wide variety of music, talk, news, and sports content, where such content can be received from one or more streams and from diverse sources. In an exemplary example of a Satellite Digital Audio Radio Service ("SDARS"), or similar programming service, Featured Favorites can make radio receivers, user devices and other products increasingly attractive to consumers, while also leveraging additional commercial value from a unique broadcast pipe of diverse curated content such as an SDARS in general, and the Sirius XM SDARS services in particular.

In exemplary embodiments of the present invention, a Featured Favorite operation can also include Smart Favorite™ support. As described in PCT/US2012/025091 filed on Feb. 14, 2012 (the "Tune Start" application), a Smart Favorite™ channel is a channel designated for maintenance by a user device in a background Instant Replay (IR) Buffer. When selecting a Smart Favorite™ channel, the radio receiver or user device can start playing the currently aired track (e.g., song, news segment, talk segment, etc.) from the channel at the beginning of the track, instead of from the current real-time or live position due to it having been buffered in the BIR buffer. This capability of Smart Favorite™ channels is sometimes known as the "Tune Start™" feature. Alternatively, a Smart Favorite™ channel can also be tuned to live content (based on, for example, content type, channel type, user selection, or other criterion). Regardless of whether the selected Smart Favorite™ channel plays live content or from a buffered track, after tuning a user can manually skip back to the start of a buffered track. The buffer may hold a plurality of tracks depending on the track durations and the capacity of the channel's buffer. Additionally, a user has the ability to initiate a content scanning operation whereby tracks (e.g., songs, news/talk segments, etc.) previously aired and buffered for a plurality of designated channels can be played in succession from the start for a few seconds for each track (or optionally live for certain designated channels), until the user halts the scanning and continues to enjoy the full track on which the user stopped the scan.

Overview of Exemplary System Architecture

Exemplary embodiments of the present invention are next described herein with reference to a satellite digital audio radio service (SDARS) that is transmitted to various receivers by one or more satellites and/or terrestrial repeaters. It is to be understood that the source content stream(s) used in connection with a Featured Favorite operation in accordance with the present invention can be broadcast, streamed or otherwise transmitted using other content delivery systems (e.g., other digital audio broadcast (DAB) systems or high definition (HD) radio systems, or two-way Internet Protocol (IP) system), as well as other wireless or wired methods for signal transmission. Further, it is to be understood that the source content stream(s) used in connection with a Featured Favorite operation in accordance with the present invention can be received by various user devices.

FIG. 1 depicts an example of a broadcast or streamed content delivery system in accordance with an exemplary embodiment of the present invention. FIG. 2 illustrates exemplary end-to-end delivery of Featured Favorites data according to exemplary embodiments of the present invention. Beginning at the top right of the figure there is a Featured Favorites TDS encoder which can, for example, passes a Featured Favorites TDS file to a feeder, which in turn passes Featured Favorites TDS messages to an SDTP packet composer which can, for example, output SDTP packets for transmission over a communications network, for example. On the receiving end of the network the SDTP packets are received as shown in the bottom portion of FIG. 2 beginning at the bottom left. It is noted that FIG. 2, being an end-to-end delivery depiction, has both the transmit side from the broadcaster/content provider's perspective and the receive side from the user's perspective.

Continuing with the bottom portion of FIG. 2, a Message Producer receiver receives SDTP packets and provides them to an SDTP packet parser. The SDTP packet parser hands off Featured Favorites TDS messages extracted from the SDTP packets to the receiver, or a portion thereof adapted to interpret the TDS messages, and create a Featured Favorites TDS message file therefrom. This file, in turn, can be provided to a TDS decoder, which can then use the relevant information to create and display to a user of the receiver Featured Favorites as described herein.

Figure 2A:
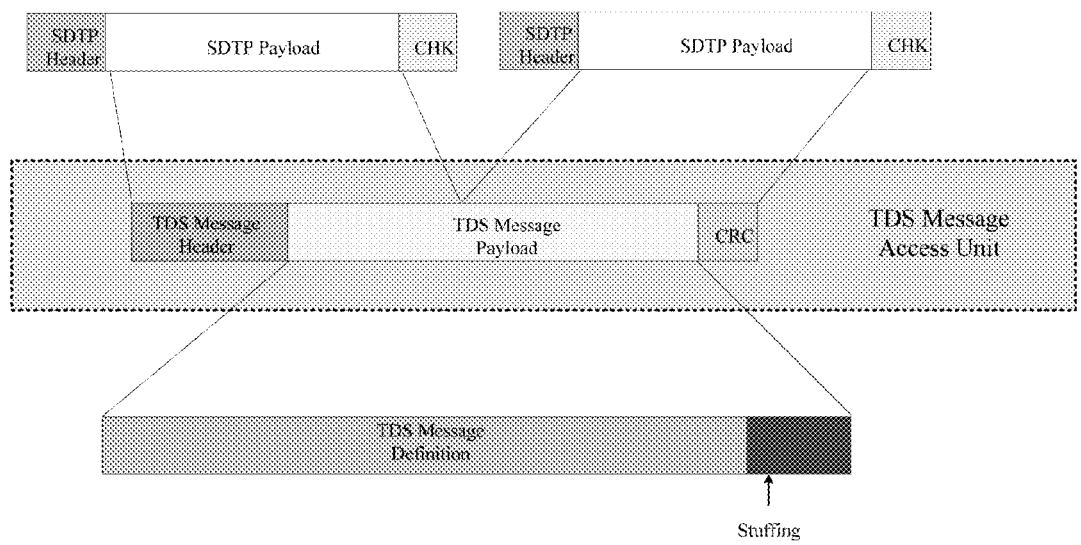
FIG. 2A depicts exemplary TDS message framing and SDTP packet multiplexing in accordance with an exemplary embodiment of the present invention.
Figure 2A:
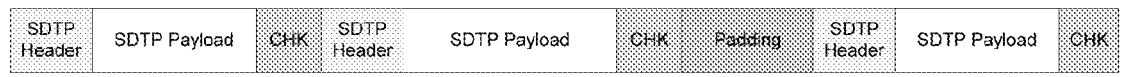

FIG. 2A shows exemplary TDS message framing, as well as exemplary SDTP packet multiplexing, according to exemplary embodiments of the present invention. As noted above, an exemplary Featured Favorites TDS file and TDS messages can be incorporated in SDTP packets, as shown in FIG. 2 and as shown in detail in FIG. 2A.

Figure 3:
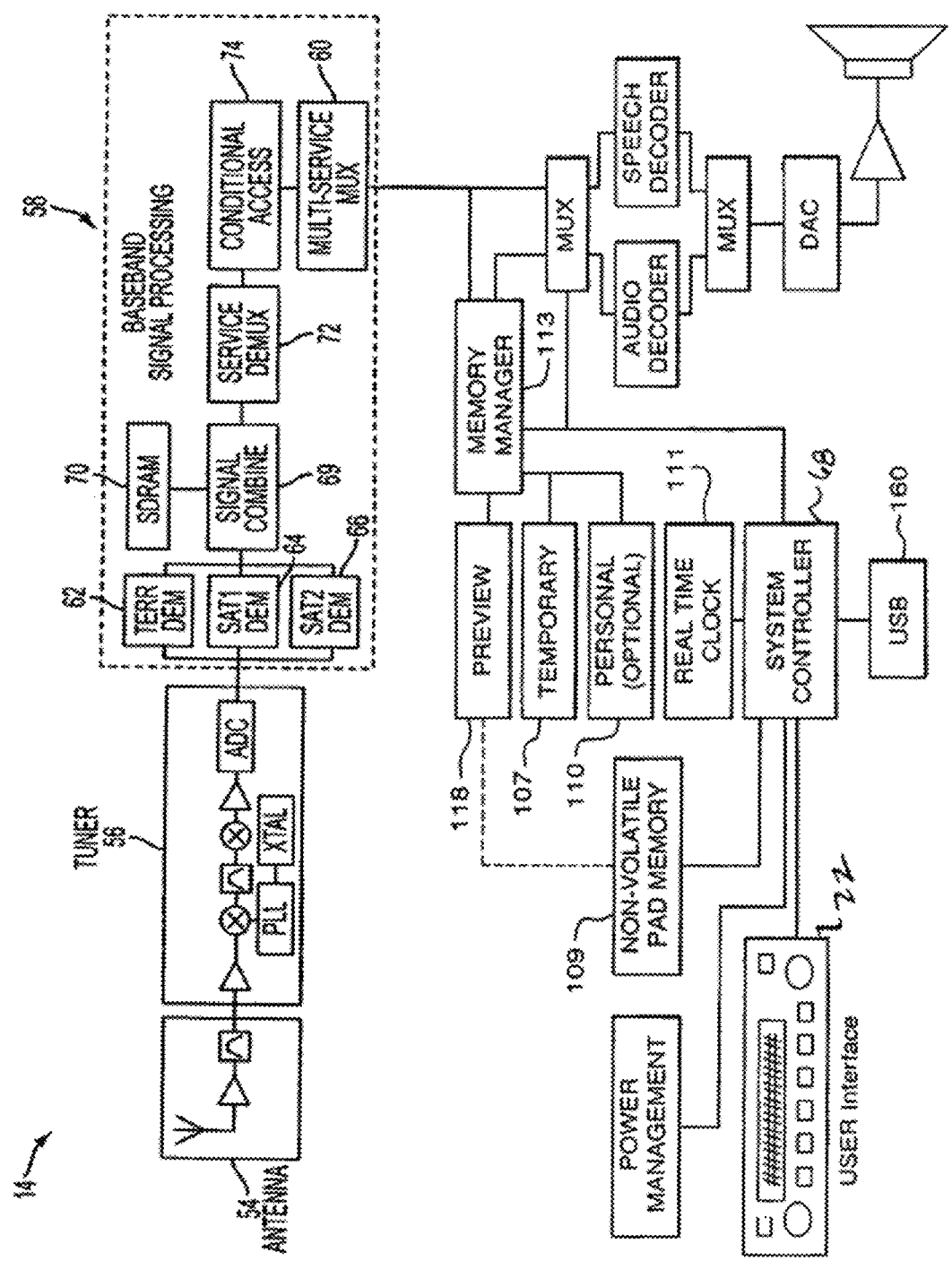
FIG. 3 depicts a radio receiver or other user device configured to receive broadcast or streamed content in accordance with an exemplary embodiment of the present invention.

Next described, with reference to FIG. 3, is an exemplary receiver that can be used in connection with various exemplary embodiments of the present invention. Receiver 14 preferably comprises an antenna 54 for receiving, for example, an SDARS signal and/or other broadcast, or otherwise transmitted streams, a tuner 56, baseband signal processing components indicated generally at 58, a system controller 68, a multi-service multiplexer MUX 60 and memory, among other components. As stated above, exemplary embodiments of the present invention can be implemented in other types of user devices that can receive content (e.g., metadata and/or audio and/or video delivered by broadcast or streaming) such as mobile telephones, personal computers, personal data assistants, portable computing devices, different types of receivers, and so on.

With further reference to FIG. 3, receiver 14 preferably comprises three receiver arms for processing the SDARS broadcast stream received from two satellites 12, 16 and terrestrial repeater 17, as indicated by demodulators 62, 64, 66. These can be demodulated, combined and decoded, for example, via signal combiner 69 in combination with SDRAM 70, and demultiplexed to recover channels from the SDARS broadcast stream, as indicated by signal combining module 69 and service demultiplexer module 72. Processing of a received SDARS broadcast stream is described in further detail, for example, in commonly owned U.S. Pat. Nos. 6,154,452 and 6,229,824, the entire contents of which are hereby incorporated herein by reference. Conditional access module 74 can optionally be provided to restrict access to certain demultiplexed channels. For example, each receiver 14 in an SDARS system can be provided with a unique identifier allowing for the capability of (i) individually addressing each receiver 14 over-the-air to facilitate conditional access, such as enabling or disabling services, or (ii) providing custom applications such as individual data services or group data services. The demultiplexed service data stream can, for example, be provided to system controller 68 from multi-service multiplexer 60.

Exemplary User Interface and User Interaction

FIGS. 4-22, next described, illustrate various exemplary screenshots that can be used in connection with a Featured Favorites functionality according to exemplary embodiments of the present invention.

Figure 4:
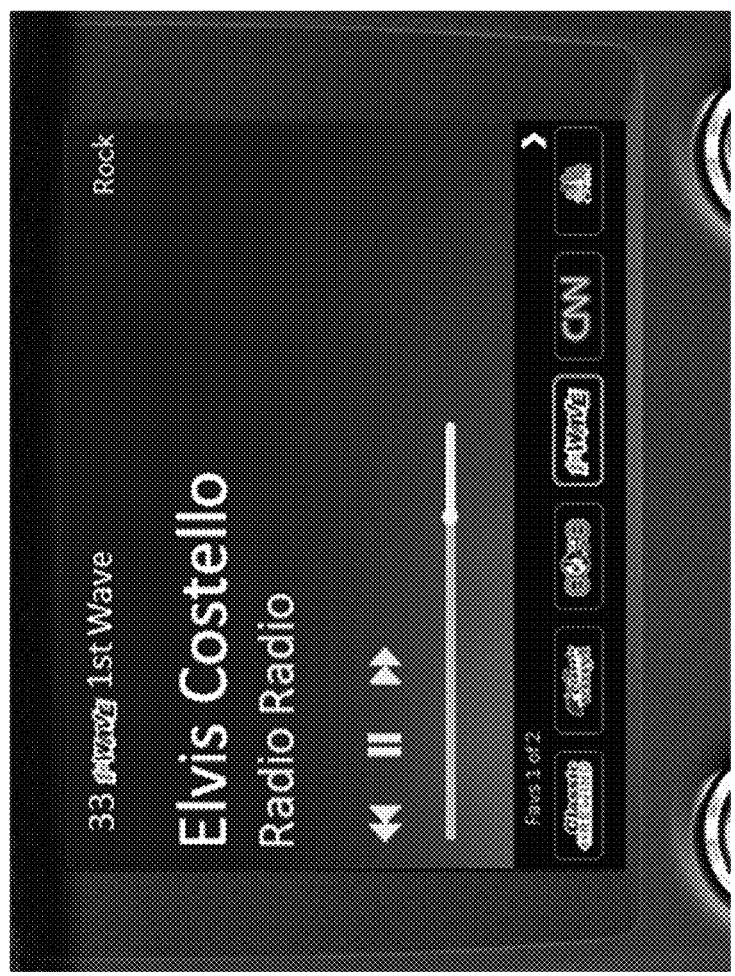
FIGS. 4-22 depict exemplary user interfaces for navigating broadcast or streamed content in accordance with exemplary embodiments of the present invention.
Figure 5:
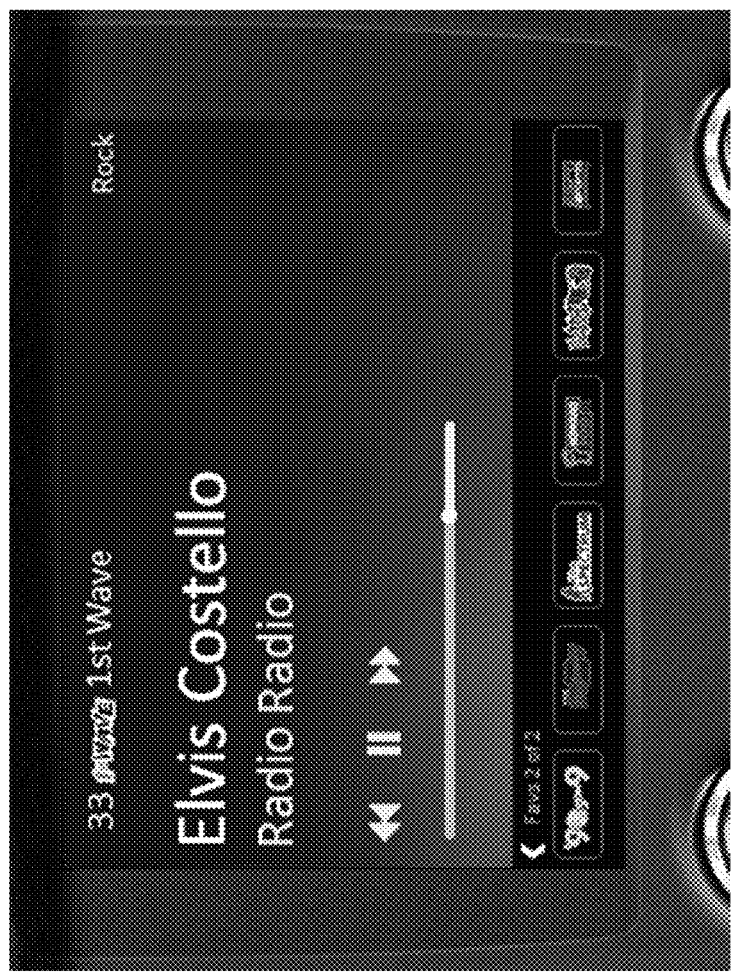

FIGS. 4 and 5 show a user playing a song on Channel 33, entitled "Radi Radio" by Elvis Costello. They also show one of two available banks of favorites, the other bank shown in FIG. 5. Hence the displayed legend "Favs 1 of 2" and "Favs 2 of 2" in FIGS. 4-5, respectively. FIGS. 6-19, next described, shows additional exemplary screens where there are six sets of favorites, being the first two sets of FIGS. 4-5, with an additional four sets, some of which are "Featured favorites" as described above.

Figure 6:
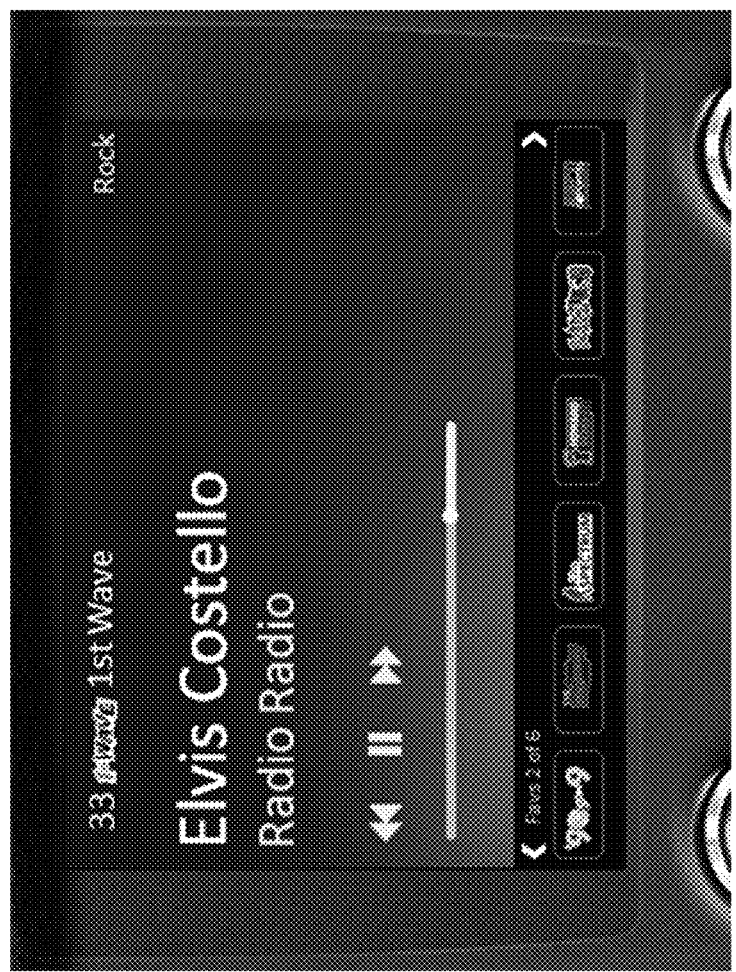
Figure 7:
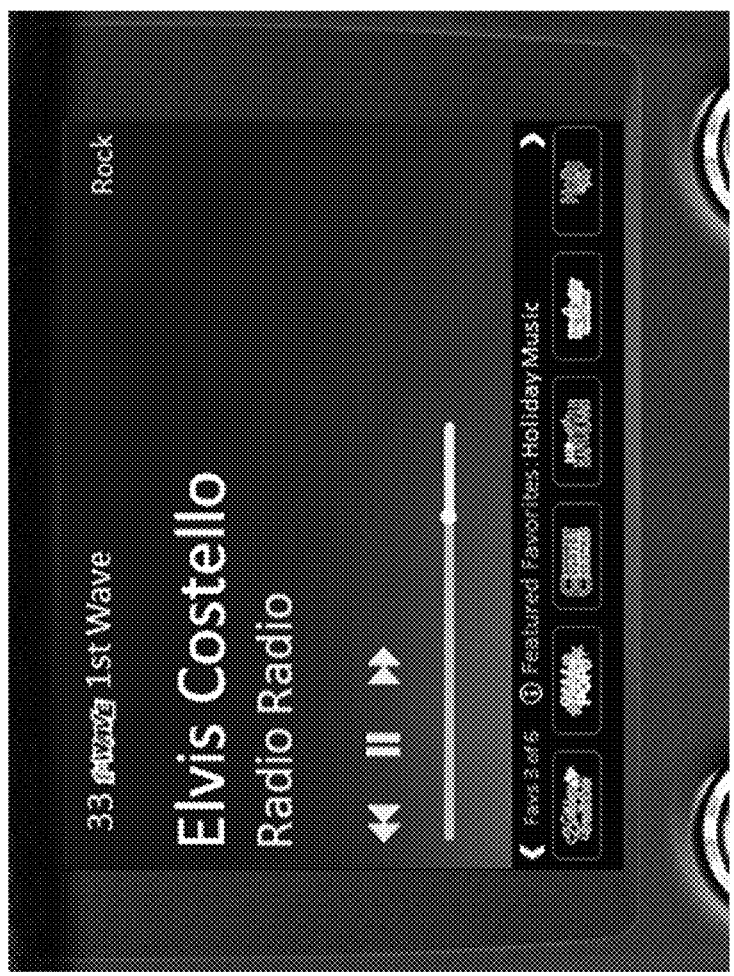
Figure 8:
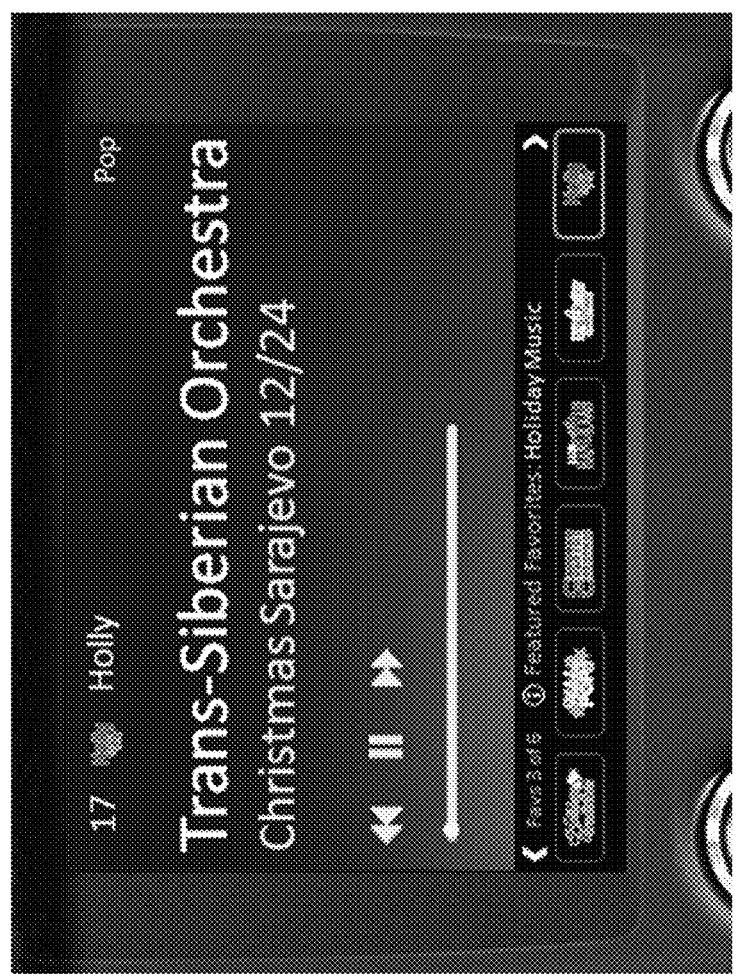
Figure 9:
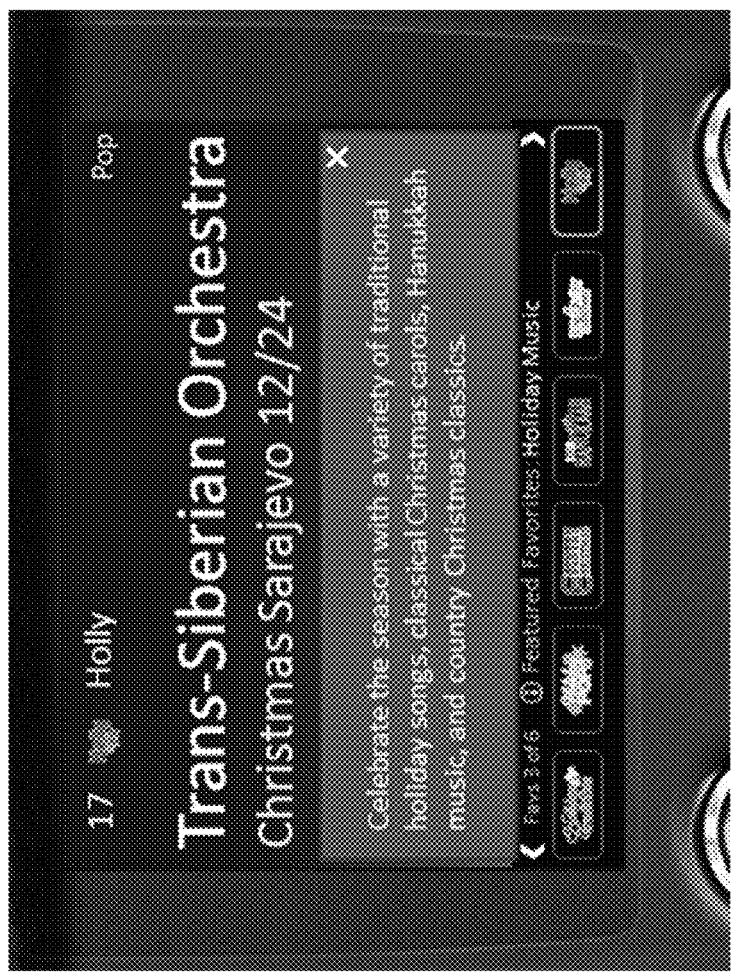

In FIG. 6 and FIG. 7, the user continues to listen to "Radio Radio" on Channel 33 as she flips through the available favorite screens. FIG. 7 shows the third bank of favorites, and also displays, according to an exemplary embodiment of the present invention, an indication of a "Featured Favorite" (which does not appear on the earlier 2"regular" favorite banks shown in FIGS. 4-6. Thus, in FIG. 7, as well as in FIG. 8, is an information button alerting the user to the fact that there are Featured Favorites available, here, namely "Holiday Music." FIG. 8 shows the same screen of FIG. 7 except that here the user has selected one of the Featured Favorites (see the blue rectangle surrounding Channel 17's icon) and has selected Channel 17, "Holly"—a Christmas channel. This plays the song "Christmas Saravejo 12/24", by Trans-Siberian Orchestra. FIG. 9 depicts the blurb that explains what "Holly" is all about, and FIG. 10 shows the aftermath of pressing the "x" at the top right of the blurb window in FIG. 9.

Figure 10:
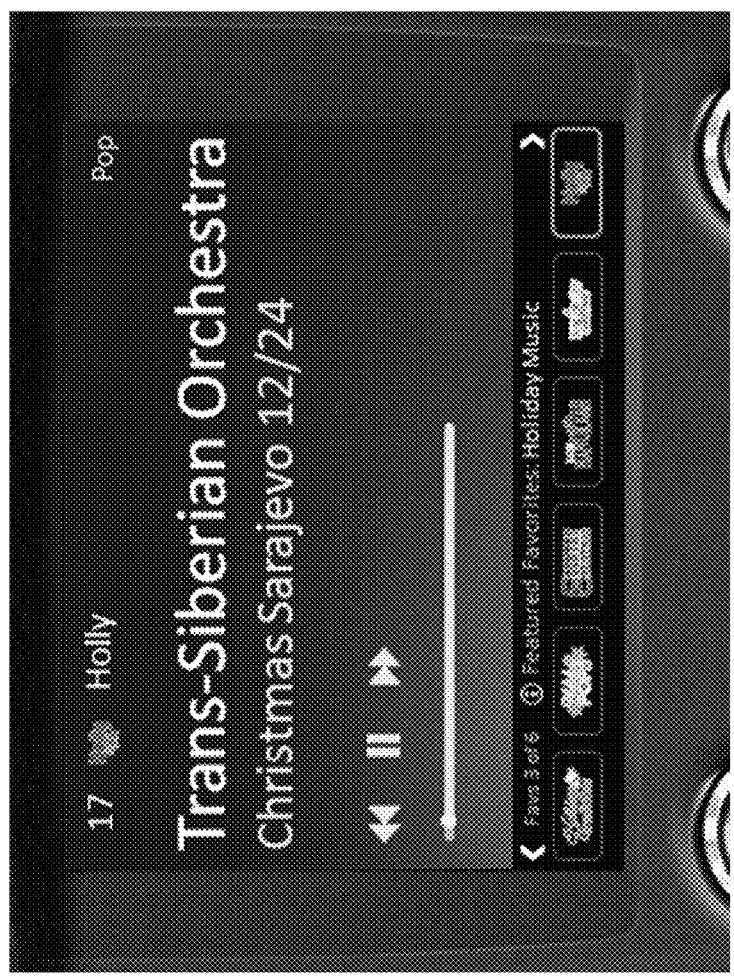
Figure 11:
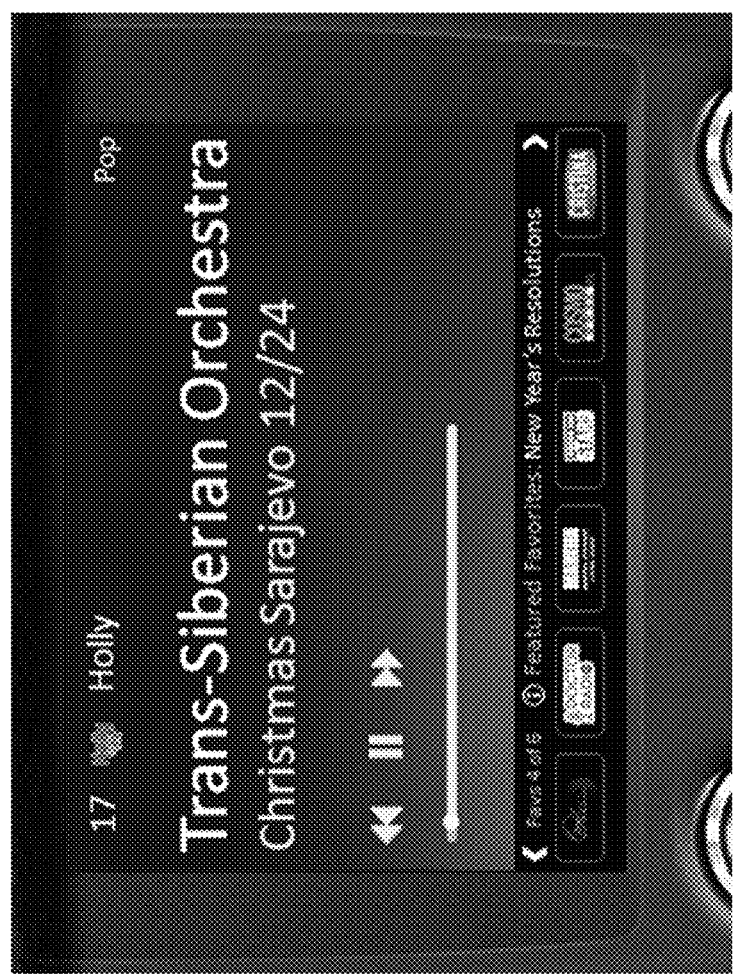
Figure 12:
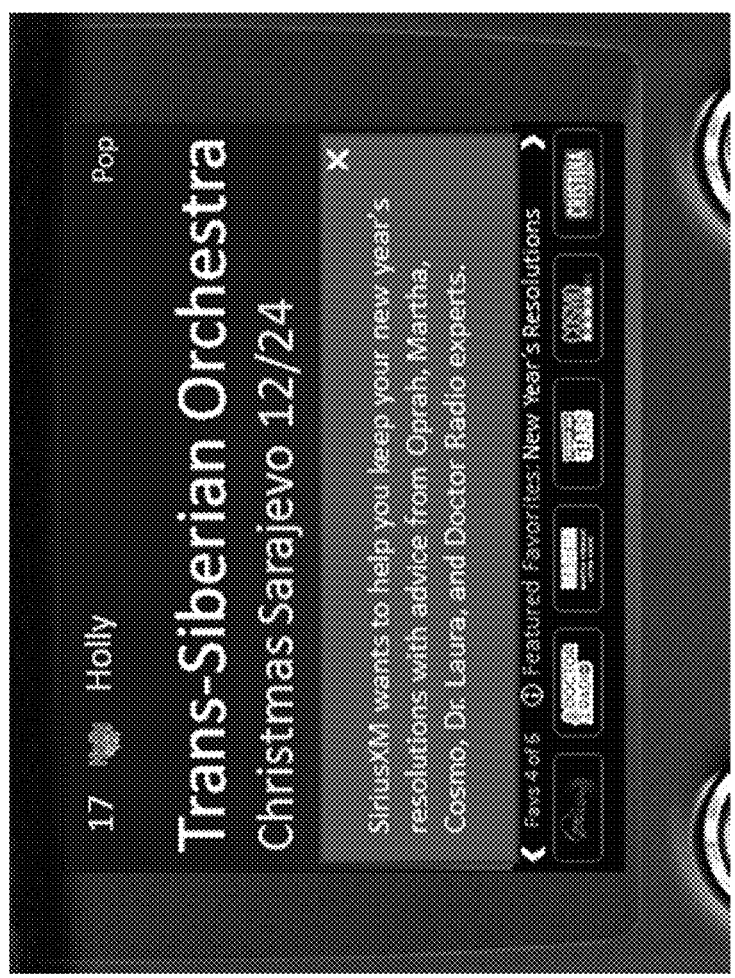
Figure 13:
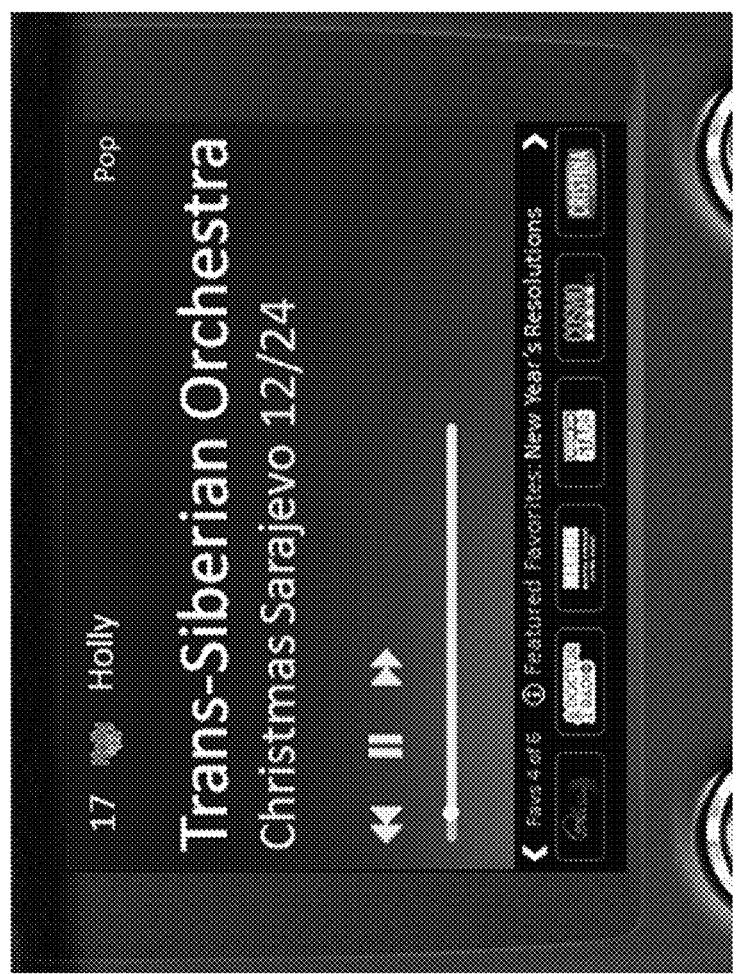
Figure 14:
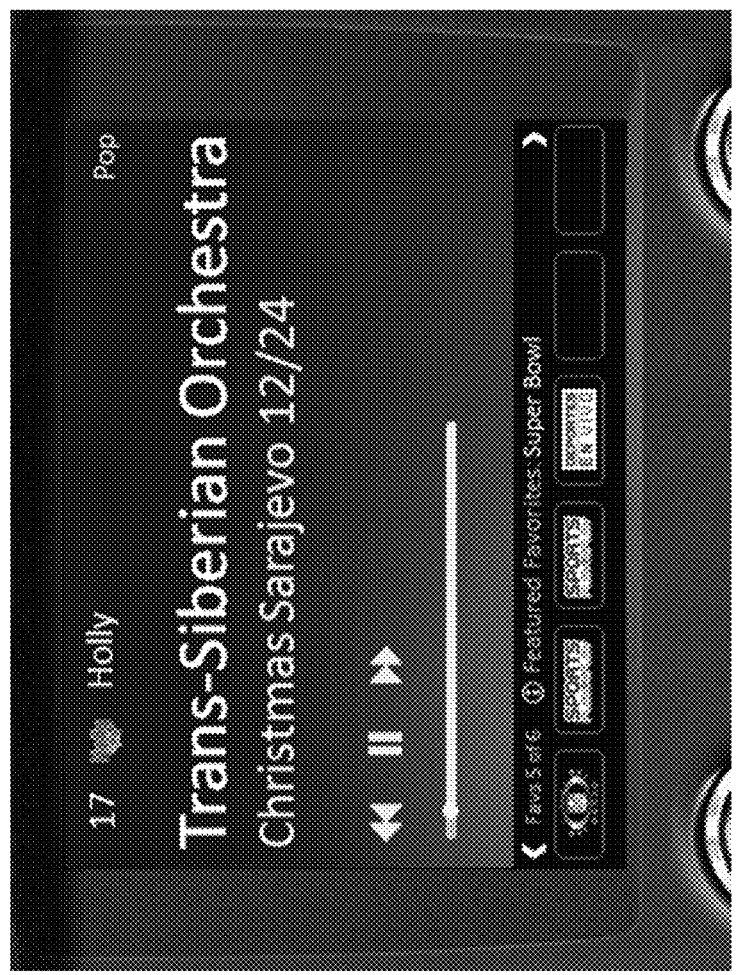
Figure 15:
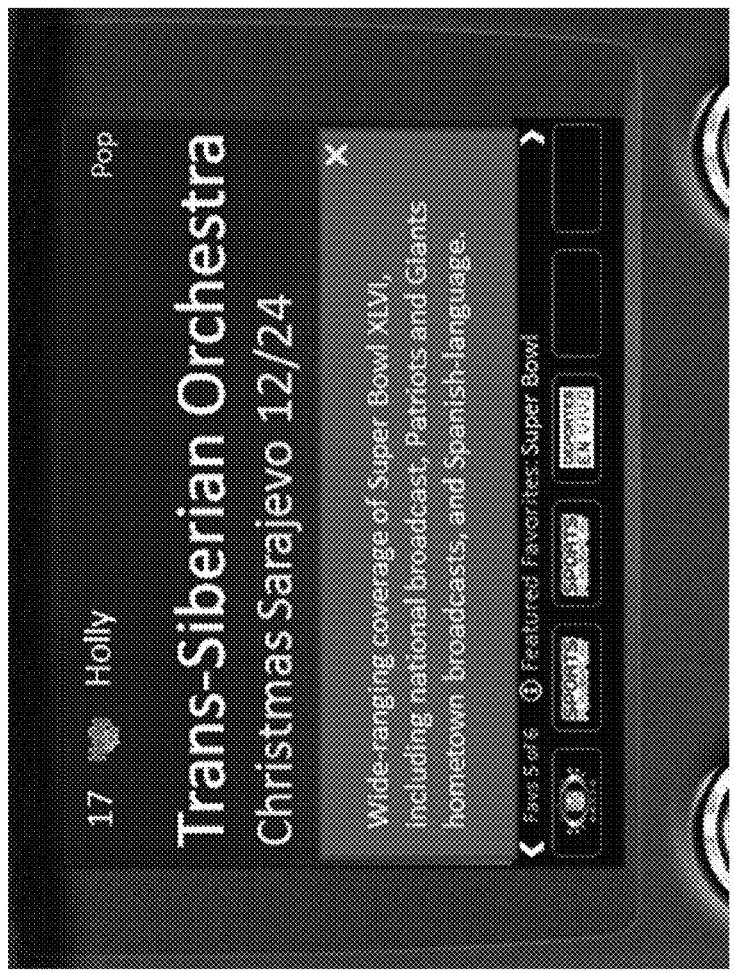
Figure 16:
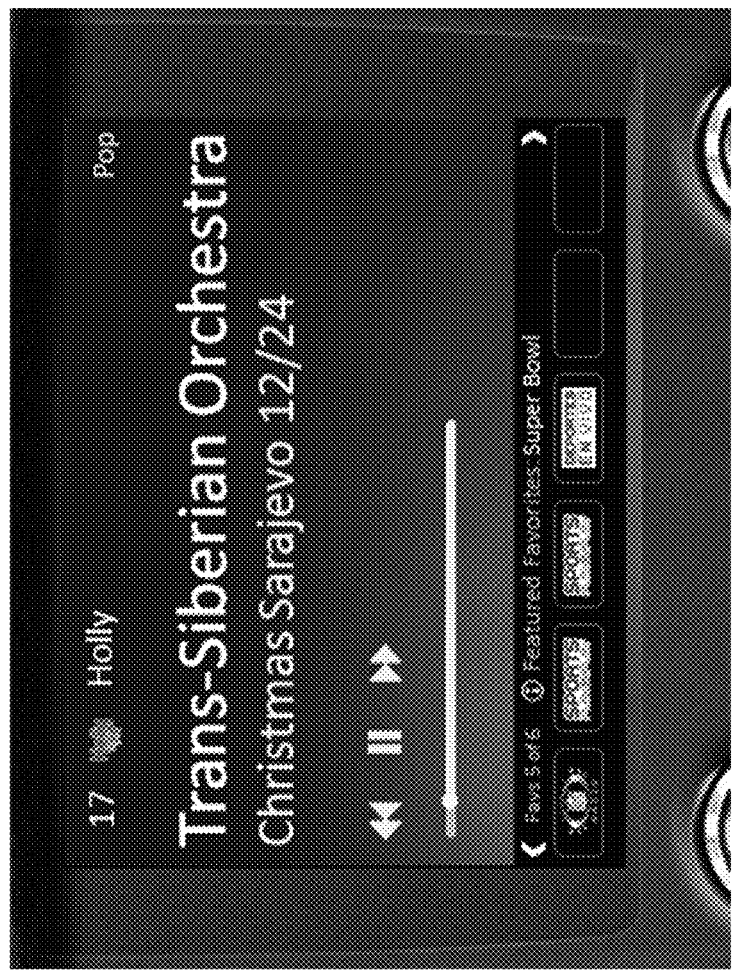
Figure 17:
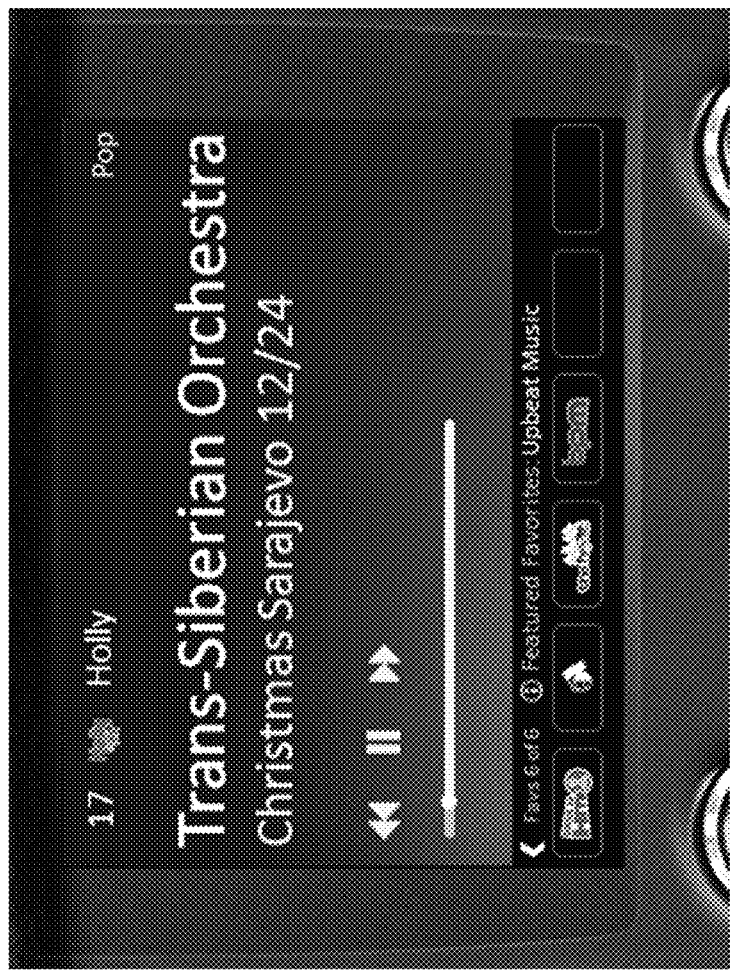
Figure 18:
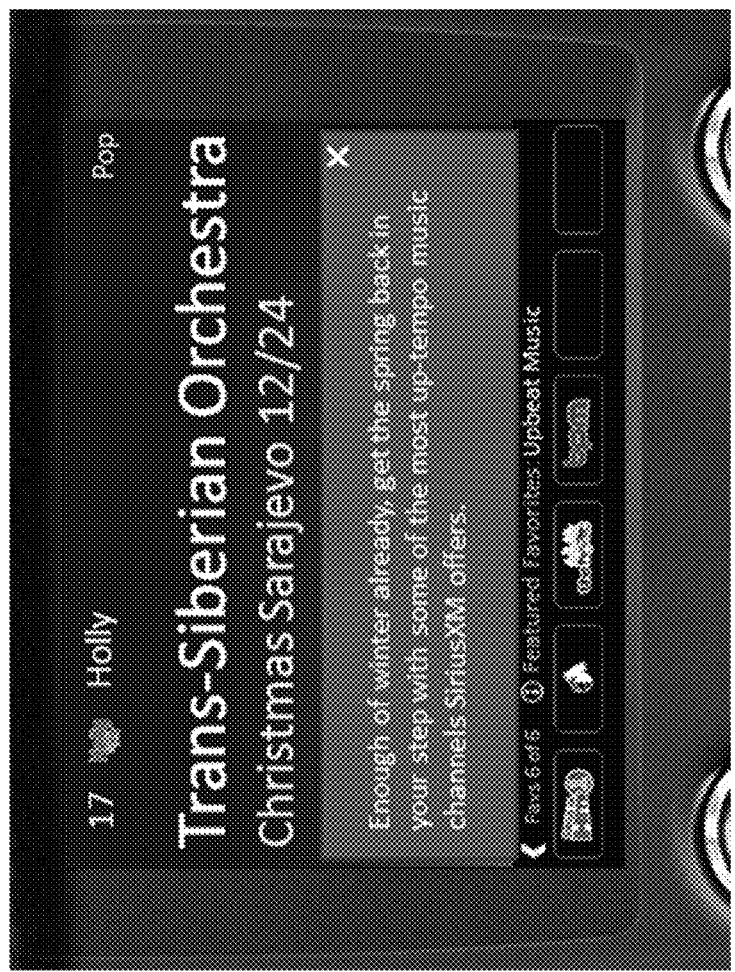
Figure 19:
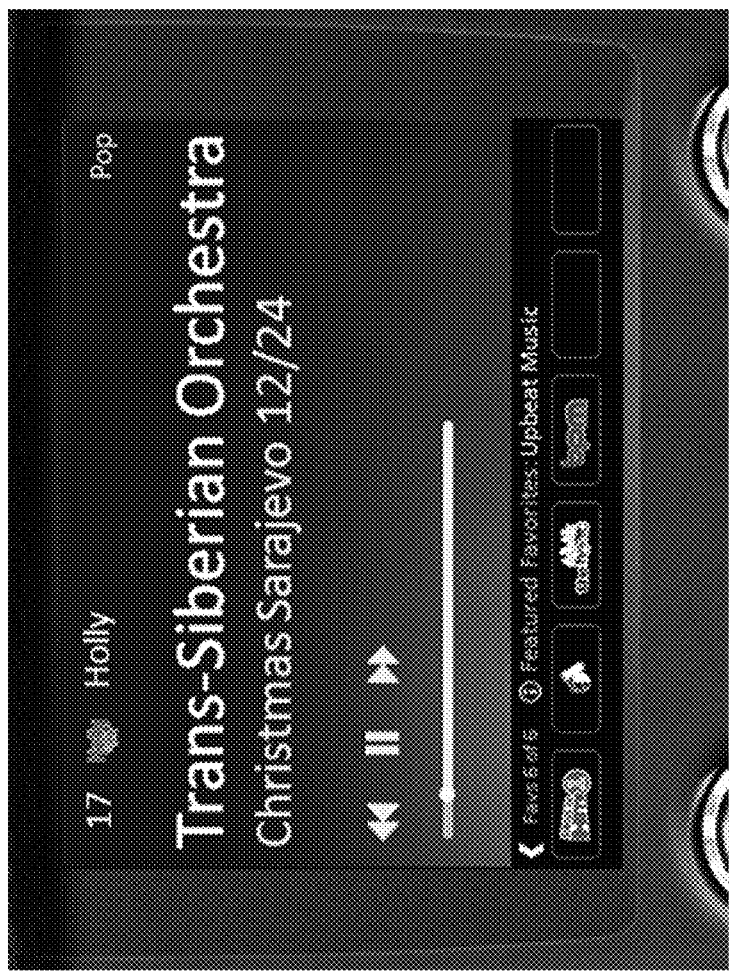

Thus, with reference to FIG. 10, is the user continues to listen to the song on Channel 17, and sees the regular listening screen. FIG. 11 shows the user having cycled through the favorites banks again to see the fourth of sixth favorite screens, and now he can see another Featured Favorite—"New Year's Resolutions" which is a collection of channels that programming has decided relate particularly to the New Years' time of year. In FIG. 12 the user continues to listen to the Holly channel but now sees a blurb regarding the "New Year's Resolutions" Featured Favorite bank of channels. Upon pressing the X at the upper right of the Featured Favorite blurb in FIG. 13 the user returns to the listening screen, and sees the fourth set of favorites and the Featured Favorites "New Year's Resolution" being shown but without its informational blurb. Finally, FIG. 14 shows the fifth bank of favorites and there is here a new Featured Favorites entitled "Super Bowl." To find out what Super Bowl provides, a user can press on the information screen and see the blurb as provided in FIG. 15. Upon pressing the X on that blurb the user returns to the "Favs 5 of 6" screen and continues to listen to the Christmas song on Channel 17, Holly, namely Christmas Saravejo 12/24", by Trans-Siberian Orchestra. Finally, by clicking the right arrow at the bottom right of FIG. 16 the user moves to the sixth and final favorites screen where the Featured Favorite here presented is entitled "Upbeat Music" which, of course, has a number of channels associated with it. By pressing on the "Upbeat Music" words, for example, or on an informational icon, for example, a user sees the blurb which explains why there is a Featured Favorite known as Upbeat Music—it relates to getting the "spring back in your step with some of the most uptempo music channels Sirius XM offers." Upon a user touching the X in the upper right of the blurb box, the user returns to the 6 of 6 favorites screen as shown in FIG. 18, and as can be seen is still listening to the Trans-Siberian Orchestra on Channel 17.

Figure 20:
Figure 21:
Figure 22:

FIGS. 20-22 show conventional favorites in FIG. 20 under the Rock category, as well as two screens which feature Featured Favorites, namely "Holiday Music" and "New Year's Resolutions", as described above.

Exemplary System Overview and Featured Favorites Functionality

In exemplary embodiments of the present invention, exemplary service transmission channels can provide payload content, such as, for example, audio clips of music, talk and other information and entertainment content, and "Table Data Service" (TDS). The TDS data can be used to transmit information on the banks. Banks can be named, so that a receiver capable of displaying featured bank names, can display the names. Banks can also be accompanied with text descriptions to provide further information to the user. Multiple arrangements of a bank can be defined for the radio receiver supporting different maximum numbers of channels per bank. Thus each bank arrangement can be optimized to include the channels and placement order best for different target products.

As noted, a user can define his or her own preset banks of channels consisting of personal favorites. However, a content provider, for example, can also define such banks, implemented as presets, that include related channels (e.g., Featured Favorites) and broadcast such banks of channels to radio receivers 14 (as shown in FIGS. 1 and 3). For example, pressing a Favorites bar on a current Now Playing screen can produce a screen displaying a list of favorite channel sets, while audio continues playing on the then tuned channel. The favorite channel sets can include both user defined channel banks, such as, for example, "User Favorites" and "User Favorites 2" as well as system or service defined channel banks, such as, for example, "Holiday Music" and "Rock Essentials." Consider the "Holiday Music" channel bank, provided by a service provider or system, for example. During the December holiday season SDARS and other audio and radio service providers produce a number of holiday channels, including, for example, traditional Christmas music, country Christmas music, a Hanukkah channel, a classical holiday music channel, etc. While SDARS listeners enjoy this content, a common user complaint is the difficulty of finding these temporary channels, inasmuch as they tend to be spread out across the lineup, crossing multiple channel categories. Using Featured Favorites, a content provider can thus define a preset bank called "Holiday Music" that can group all of these temporary and seasonal channels together, such bank only appearing in the list of preset banks during December, for example. If a user selects Holiday Music, she will see all of these channels at a glance, and can easily tune to any of them.

Other uses for Featured Favorites can include, for example, a single bank to find temporary and long-term artist channels such as, for example, channels dedicated to Pearl Jam, McCartney, Springsteen, Elvis, and so forth. Alternatively, a bank might include a collection of easy listening channels from multiple categories, jazz, pop, classical, country, to make it easy to find something if a user is that kind of mood. In addition, "celebrity" banks can be provided that cater to the Howard Stern, Martha Stewart, or Oprah fan. Such channel banks can be defined dynamically, broadcasting their definitions to radio receivers, so that they can be added, deleted, and modified at any time. As an example of a rock-oriented channel bank, "Rock Essentials" can be selected from the list of channel banks, which enables a user device to generate, for example, a "now playing" screen showing a defined bank of ten rock channels, and begin playing one of them, or, for example continue playing the then current channel, and not change the currently playing channel when selecting a new bank; i.e. no channel change until the user explicit picks one from the bank.

In exemplary embodiments of the present invention, metadata provided for each Featured Favorites bank can include, for example, but need not be limited to, title of the bank; description of the bank contents and/or purpose; imagery associated with the bank (e.g., a logo); specifications that indicate the radio receiver capabilities required for displaying a particular bank (e.g., range of number of displayable channels in the radio receiver's preset bank required to be allowed to display the bank, and/or channels or channel groups that must be tunable by the radio receiver to be allowed to display the bank), priority of the bank (e.g., which banks should be displayed to the user if the radio receiver is capable of displaying a limited set of preset banks); and duration of the bank (e.g., allowable start and/or stop dates to display the bank to the user).

Channel banks can be prioritized, for example, so that radio receivers capable of showing fewer Featured Favorites banks than are then being broadcast can, for example, show the subset of banks considered most important by the content provider. Further, the arrangement of channels within a bank can also be prioritized, and the number of channels can be limited by the ability of the radio receiver or by subscription. For example, if a radio receiver is in a limited trial period, where the subscription to every channel is not available, the radio receiver may display only banks and channels then available to the unit.

In exemplary embodiments of the present invention, channel banks can be defined, broadcast, edited, and removed from broadcast whenever desired, thus leveraging dynamic update capabilities. Therefore, whereas one Featured Favorites bank might be kept active for a year, another might only be launched for a few weeks during a promotional period. Dynamic updates to Featured Favorite banks are advantageous to the user experience by providing up to date content and/or information.

In exemplary embodiments of the present invention channel banks can be classified as to a broad purpose (e.g. for convenience in channel access, for optimizing Smart Favorites Content Scanning, or both). Additionally, channel banks can be tagged with topics or subtopics so that a radio receiver can prioritize access to banks, or, for example, create banks based on each user's historical listening interests. In exemplary embodiments of the present invention a user's favorites list or individual preference information can be used to create one or more Feature Favorites banks for that user. Additionally, the receiver could select which received Feature Favorites banks are prioritized for presentation to the user based on their match to the user's interests (e.g. by Topics associated with the Featured Favorites, or by constituent channels within the Featured Favorites that match channels favored by the user).

For example, if AltNation is listed in the user's favorites list, a Feature Favorites bank can, for example, include other channels from the "Rock" musical genre.

Exemplary Methods of Operation

An exemplary method for implementing Featured Favorites involves receiving information from the source content stream. Radio receiver 14 (FIG. 3) can receive data from a source content stream including a "Table Data Service" (TDS). The TDS data can include, for example, some or all of the following: Featured Favorites Bank Order, Featured Favorites Bank ID, Featured Favorites Bank Sequence, Featured Favorites Bank Title—Short, Featured Favorites Bank Title—Long, Featured Favorites Bank Title—Verbose, Featured Favorites Bank Description, Featured Favorites Bank Purpose, Featured Favorites Bank—Arrangement 1, Featured Favorites Bank—Arrangement 2, Featured Favorites Bank—Arrangement 3, and Featured Favorites Bank—Arrangement 4. These data fields and their contents are next described.

Featured Favorites Bank Order provides the order of banks. Radio receivers with a limited Featured Favorites banks capacity of n banks that also do not provide the user with a method of selecting which banks they want to keep, can, for example, present the first n eligible banks from the list to the user, and ignore the rest. The order can be provided through the data service as an integer assigned to each Featured Favorites bank, with each bank uniquely numbered from 0 to N−1, where N is the total number of banks defined by the service.

Featured Favorites Bank ID allows the radio receivers to unambiguously match an updated bank with a previously saved bank. This can be particularly important if an exemplary product allows the user to previously select some subset of banks for ongoing use, so the updates can be applied against the correct stored banks.

Featured Favorites Bank Sequence provides a means for receivers to determine if there has been a change to any bank, and if so, which specific bank(s) were changed.

Featured Favorites Bank Title—Short, Featured Favorites Bank Title—Long, and Featured Favorites Bank Title—Verbose all provide information on the name of the Featured Favorites bank. Because of various user interfaces of the radio receivers have various limitations, the source data stream may provide multiple variations of essentially the same data.

Featured Favorites Bank Description provides an optional text description for each bank. This information may be of use to the user. The amount of data displayed may also be limited by the user interface of the radio receiver.

Featured Favorites Bank Purpose can be a feature which assigns bank with a particular purpose. A bank may be assigned with the purpose of convenience, where the bank serves to make access to a topical group of channels easy for the user to access. A bank may be assigned with the purpose of scanning, where the bank is optimized to maximize its use for the Content Scanning capability when the channels are designated as Smart Favorites.

Featured Favorites Bank—Arrangement 1, Featured Favorites Bank—Arrangement 2, Featured Favorites Bank—Arrangement 3, and Featured Favorites Bank—Arrangement 4 are examples of providing a different set and/or order of preset channels within the same bank. The various arrangements relate to differing capabilities of receivers, which can be limited by, for example, content, memory (e.g., RAM, HDD, flash or other storage media), or by some other means. Each arrangement can provide different channels and/or numbers of channels within a particular channel bank. It is preferable that at least one arrangement matches the capability of the radio receiver. However, if no arrangement matches the receiver's capability, then the particular bank may be ignored. If multiple arrangements fit the capabilities of the radio receiver, the radio receiver can, for example, select the first matching arrangement. Generally, however, it is expected that a receiver will match only one of the arrangements.

For example, consider a "Welcome to SXM" bank that includes an assortment of music, talk, news, and sports channels most likely create a positive first impression for the largest trial automotive audience segment. For a ten-channel version of this bank, the version can include 4 music channels, 2 news channels, 2 talk channels, and 2 sports channels, appearing in that logical order within the bank. However, for a six-channel arrangement, it can include, for example, 3 music channels, 1 news channel, 1 talk channel, and 1 sports channel. The six-channel arrangement is thus not simply a truncated version of the ten-channels arrangement; rather, each arrangement includes channels designed to meet the goal of the bank, but selected and ordered to match the capabilities of the radios using them.

Alternatively, if receiver is not able to display as many channels as are in a particular bank (i.e., a six channel bank on a receiver with a four channel display limit), the device can ignore the extra channels (i.e. truncate the list). Thus, in some exemplary embodiments, a single arrangement can be defined for a bank, with all receivers using that arrangement and simply truncating the presets they cannot show. However, in other embodiments, a multiple arrangement capability can be used, which allows a content provider to optionally craft arrangements of a given bank that are more finely tuned to the radios or receivers that will display them, and thereby eliminate scenarios where some radios must truncate a fixed list of presets in a Featured Favorites bank.

In exemplary embodiments of the present invention the method described above can be further modified to include Featured Favorites banks that are defined and displayed based on one or more of a user profile and user behavior. Thus, for example, a selection of which Featured Favorites banks are to be defined and displayed can, for example, be based on user preferences as to types of programming, demographic information, user surveys, user profile, user selection of channels, user stickiness to channels metrics, and/or other criteria. In exemplary embodiments of the present invention this determination can be done by the receiver itself, thus obviating the need for an uplink.

Receiver Management and User Interactions

As noted above, Featured Favorites operation can involve receiving information from a content stream or source, where the featured favorites information is encoded as metadata. For example, a receiver resident application can receive the complete set of all Featured Favorites banks and metadata from the broadcast data service, and passed from the Module to the Host application through messages provided through the Module. The radio receiver may ignore Featured Favorites banks that do not match the capabilities of the radio receiver. If there are multiple Featured Favorite banks that match the capability of the radio receiver, the selection of which banks to be displayed may be determine the content provider (by method of prioritization, etc.), by the radio receiver, or by the user interface may allow the user to select which bank to display.

The radio receiver may also store the Featured Favorite bank information in the non-volatile memory (e.g., RAM, HDD, flash or other storage media) of the device, so the banks are available after a power cycle. The radio receiver may also monitor for changes to the Feature Favorites banks, including changes to channel lineup, order, or deletion.

The supported Featured Favorites banks are provided to the user as part of overall product management of presets. There are many different methods for bank management, so presentation can vary from product to product. One method may be for the user to navigate by cycling through the list of banks. Other exemplary methods include a radio receiver that provides user favorites as an extension to category navigation may add the Featured Favorites as additional "category" lists following the user favorites list as the user navigates through categories, a radio receiver with a traditional automotive "bank" button to cycle through preset banks can add the Featured Favorites as banks reached after cycling through the user preset banks, a radio receiver that provides a scrollable list of user-named favorites lists may add the names of the Featured Favorites banks to the end of the list, or a radio receiver may provide a dedicated scrollable list of the names of the Featured Favorites banks. In exemplary embodiments of the present invention a radio receiver can, for example, provide a higher level navigation method allowing the user to select either a list of user presets or Featured Favorites. Once inside of a bank list, the user interface may list the channels within the bank. The user may also select Content Scanning within the bank. With the Smart Favorite™ support, Content Scanning with Tune Start™ provides for a better user experience.

As noted above, an "Arrangement" is an ordered set of channels for a bank, along with constraints on the number of presets per bank that must be supported by a product for that product to use the Arrangement.

In exemplary embodiments of the present invention, Up to four Arrangements can be defined for a given bank. This can allow, for example, a programming team to optionally define different Arrangements (i.e., lists of channels) to target different classes of products based on their maximum number of supported presets per bank. In exemplary embodiments of the present invention, all Arrangements of a given bank can be mutually exclusive in their use. Thus, for example, one Arrangement could be used for radios supporting less than 10 presets per bank, and another for radios supporting 10 or more presets per bank, but for a given bank each radio would use only one Arrangement suitable for its UI and ignore the other Arrangements.

As an example of this capability, one can consider a "Welcome to SXM" bank that includes an assortment of music, talk, news, and sports channels most likely create a positive first impression for the largest trial automotive audience segment. For a 10-channel Arrangement of this bank, a given service could, for example, include 4 music channels, 2 news, 2 talk, and 2 sports channels, appearing in that logical order within the bank. However, for a 6-channel Arrangement there might be included 3 music, 1 news, 1 talk, and 1 sports channel. The 6-channel Arrangement is thus not simply a truncated version of the 10-channel arrangement. Rather, each Arrangement can include channels designed to meet the goal of the bank, but selected and ordered to match the capabilities of the radios using them.

Figure 23:
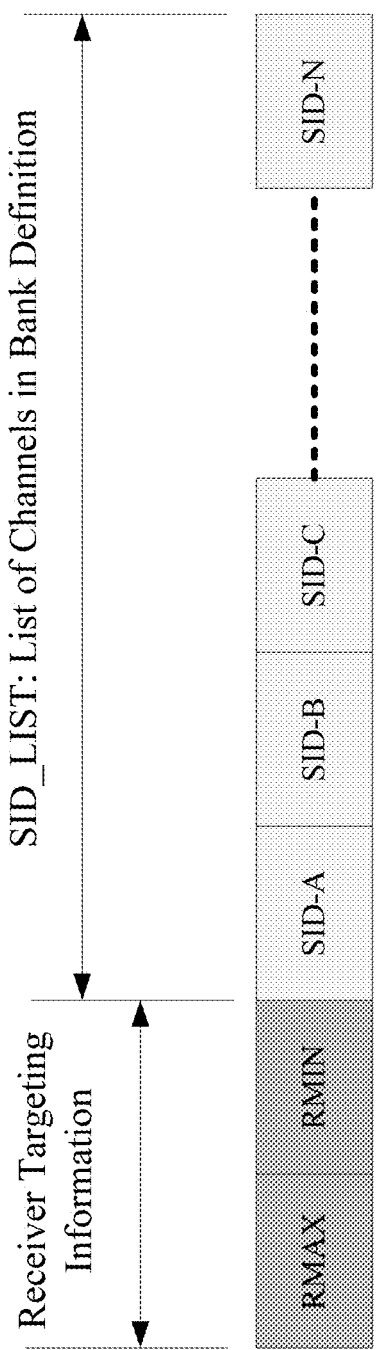
FIG. 23 depicts an exemplary SDI-List message in accordance with an exemplary embodiment of the present invention.

Each Arrangement, if present, can, for example, comprise an Array of 2 to 34 entries containing the following UINT16 elements in the order shown, and illustrated in FIG. 23, for example:

RMAX—Only products supporting RMAX or fewer presets per bank can, for example, be allowed to use this Arrangement. A value of 0x3FF (1023) indicates no maximum is applicable. A value of 0 means all receivers shall ignore this Arrangement. RMAX is always present in the Arrangement array.

RMIN—Only products supporting at least RMIN presets per bank can, for example, be allowed to use this Arrangement. A value of 0 indicates no minimum is applicable. RMIN is always present in the Arrangement array.

SID_LIST—A list of SIDS, identifying the channels in the bank, listed in the order they should be presented in the bank. The number of entries in the SID_LIST can range from 0 to 32.

Operationally, where multiple Arrangements are provided for a given bank, the ranges of presets-per-bank defined by RMAX/RMIN can, for example, be non-overlapping, so that at most one Arrangement will match the capability of a given receiver. However, it is possible that no Arrangements match the capability of a receiver (i.e., the receiver's presets-per-bank do not fit within any of the Arrangements' RMAX/

RMIN ranges), and that bank ca therefore be completely ignored by the receiver, for example.

In exemplary embodiments of the present invention, a receiver can, for example, support at most one of the Arrangements provided for a given bank, observing the following policy requirements: (i) only an Arrangement for which the receiver's supported maximum presets per bank fit within the range specified by RMAX and RMIN can be used by the receiver; (ii) only one Arrangement per bank can be supported. (In the unexpected case that more than one Arrangement could be supported, the receiver can support only the first Arrangement determined to be supported n such an exemplary system.); and (iii) if no Arrangements are supported by the receiver, the entire bank can be ignored.

In exemplary embodiments of the present invention, a product can display a list of channels in the bank in the order specified in the Arrangement SID_LIST. If the supported Arrangement contains fewer channels that the maximum presets-per-bank supported by the product, the product shall display the unused preset slots as unassigned. If the supported Arrangement contains more channels that the maximum presets-per-bank supported by the product, the product shall ignore the channels beyond the presets-per-bank supported by the product.

Exemplary Pseudocode for Processing Arrangements

In exemplary embodiments of the present invention, code implementing the following pseudocode can, for example, be used to process arrangements on a receiver-resident application, module or processor, for example:

RPRESETS=The total number of presets per bank supported by the product.

SIDCOUNT=The Total number of SIDs included in the Arrangement SID List (This is equal to the number of elements in the arrangement Array, minus 2)

```
IF ((RMAX == 0x03F) OR (RPRESETS <= RMAX)) THEN
    IF ((RMIN==0) OR (RPRESETS >= RMIN)) THEN
        StoreSIDList( )
    ELSE
    Product ignores this Arrangement
    ENDIF
ELSE
    Product ignores this Arrangement
ENDIF
/* Note: If RMAX==0x000, the Arrangement is also ignored, but this is
handled in the first IF statement since RPRESETS is always > 0) */
FUNCTION StoreSIDList( )
    IF (SIDCOUNT > RPRESETS) THEN
        Store the first RPRESETS number of SIDs from the list as the bank
        channels
    ELSEIF (SIDCOUNT < RPRESETS) THEN
        Store all the SIDs from the list as the bank channels, leaving left over
presets in this bank unassigned
    ELSE
        Store all the SIDs from the list as the bank channel (all presets
        assigned)
    ENDIF
ENDFUNCTION
```

Appendices A and B

Featured Favorites Service Brief and Featured Favorites User Interface Requirements Next described are two appendices. Appendix A, a "Featured Favorites Service Brief", and Appendix B, a "Featured Favorites User Interface Requirements" document. These describe an exemplary Featured Favorites service designed by Assignee according to an exemplary embodiment of the present invention. They are reproduced here with some editing, and they illustrate various aspects of a planned exemplary embodiment of the present invention. It is understood that these are directed to a specific exemplary embodiment of the present invention, and are understood to in no way be limiting of any other variant, alternate or modified embodiment.

A. Featured Favorites Service Brief

This Service Brief provides an introduction to the Featured Favorites service, including use cases supported by the service and the product resources needed to implement the service.

The intended audience includes OEM and aftermarket application engineers and tier 1 system integrators considering the implementation of the service in products receiving the XM band broadcast. This document also provides an introduction to the service for product systems and software engineers who will implement the service while working with other more technical documents related to the service.

1.1 Feature Objectives

The Featured Favorites service is a component of SiriusXM's "SXM 2.0" feature set, a portfolio of new radio capabilities and content.

All SiriusXM capable products provide the user with some method of accessing a short list of favorite channels, e.g., through use of preset banks or favorites lists. The Featured Favorites service augments this product capability, allowing SiriusXM to broadcast additional banks (i.e., lists) of channels to be automatically added to the product's preset banks or favorites lists, making it easier for listeners to learn about and find channels.

Featured Favorite banks are dynamic: they can be defined, added and removed from the broadcast at any time, to correspond to the programming objectives of Sirius XM. Typically a bank may be broadcast for as short as a few days for something event-driven, such as a game or specific holiday, to several weeks for a seasonal themed bank or a bank intended for content discovery.

The use cases for Featured Favorites, described in Section 2, focus on providing listeners with rapid access to groups of channels related by a theme such as holiday music during the month of December, a sports playoff season, music channels catering to a similar mood, or a variety of talk channels that might appeal to a particular group of SiriusXM listeners.

Featured Favorites benefit the listener through:

Discovery: exposing the listener to SiriusXM channels they may not yet be aware of; and Convenience: simplifying access to channels related by a dynamic theme.

The Featured Favorites service requires minimal RAM, NVM, and processing in the Host system (e.g., head unit or other connected controlling product) to implement in a product, as detailed in Section 5. Though the Featured Favorites data is broadcast as a SiriusXM data service, it is received and pre-processed by the SiriusXM receiver Module to simplify the data management tasks of the Host software.

The Featured Favorites service is designed for product UI presentation flexibility. Multiple alternatives for presenting the Featured Favorites banks to the user are available to the product designer (see Section 4.1), so the capability can be supported on a wide range of products, from a simple 2 line display to a full size graphical touchscreen, with Featured Favorites presentation options scaled accordingly.

1.2 Service Participants and Roles

Support of the features involves the following primary participants:

SiriusXM Radio defines the Featured Favorite banks (i.e., lists of channels with names, descriptions, etc.) and broadcasts this data to all radios. Software developed by SiriusXM in the receiver Module receives and pre-processes this data, passing it to the Host system for user interactions.

Product Suppliers/Developers design and produce an automotive or aftermarket product including a SiriusXM Receiver/Tuner Module. Within the product, software called the HMI (Human-Machine Interface), written by the product supplier, receives the Featured Favorites data from the Module and manages the radio user interface while interacting with the Module.

SiriusXM's role in supporting the service includes:
  Broadcasting Featured Favorites data.
  Type Approval testing of submitted products.

The Product Supplier/Developer's role in supporting the service includes:
  Implementation of product HMI software to provide user access to the service.
  Providing evidence of conformity to SiriusXM's Requirements for the service by passing formal SiriusXM Type Approval testing before product launch.

1.3 Glossary/Acronyms

| | |
|---|---|
| Content | The music, talk shows, sporting events, and other audio programs transmitted on an audio channel. |
| Global Metadata Table | A general-purpose data structure and message format used to communicate table-oriented data from the Module to the Host, used for Featured Favorites as well as other tabular data sets. |
| HMI | Human-Machine Interface. In this document, HMI refers to the layer of software written by the product developer to interact with the user and communicate with the receiver Module. |
| Host | In product architecture, the Host refers to processor and software provided by the product developer. The Host controls a separate Sirius XM receiver Module using the SXi message protocol. Host software provided by the product developer may directly interact with the Module through SXi messages, or may incorporate the SMS software library to help manage Module functions. |
| Informative | Information provided for clarification or background, but not to be treated as formal testable requirements. (see also Normative) |
| Module | The Module refers to the Sirius XM receiver running SXi firmware, controlled by the product Host. Examples include the X65Hx OEM Module family and the SXVxxx aftermarket Module family. |
| must | Term used to define an action necessary for requirements compliance. |
| NVM | Non-volatile memory, e.g., for saving data to be preserved across product power cycles. |
| Normative | Information to be treated as formal testable requirements. (see also Informative) |
| radio | In this document, refers to the entire product, not necessarily one subcomponent of the product. |
| RAM | Volatile memory, e.g., for working data not preserved across product power cycles. |
| shall | Term used to define an action necessary for requirements compliance. |
| SMS | Satellite Module Services. A middleware software library available from SiriusXM for optional integration in the Host software. |
| SXi | SiriusXM Interconnect - The message protocol used for Module-Host communications. |
| UI | User Interface |

2. Use Cases

The following are some illustrative examples of Featured Favorites use cases.

2.1 Convenience Use Cases

The following illustrate the use of Featured Favorites for listener convenience.

2.1.1 Finding Holiday Music

In late December, Joan recalls hearing that an assortment of different styles of holiday music is now being broadcast on a number of SiriusXM channels. She'd love to hear some classic Christmas songs on her shopping drives, but doesn't recall the exact channel numbers of the holiday channels and doesn't have the patience to search the entire lineup of channels to find them. However, she finds that a new preset bank labeled "Holiday Music" appears on her radio, with easy access to 6 channels playing holiday music:

Ch 4—Holiday Traditions
Ch 10—Country Christmas
Ch 77—Holiday Pops
Ch 28—Radio Hanukkah
Ch 12—Bing Crosby Christmas Special
Ch 23—Holly With these channels easily accessed directly from the radio's preset bank, she samples a couple for a few songs, deciding on Holiday Traditions to set the mood for her shopping trips.

2.1.2 Finding the Game

It's Super Bowl Sunday, and John has to be traveling during part of the game. While driving he wants to hear the game, but is unsure of which SiriusXM Play by Play channel is airing the game. He cycles through his user preset banks and finds what he was hoping for: a bank titled "Super Bowl" with four channels in the bank. He presses the radio's Info button to read a short text description of the bank:

Wide-ranging coverage of Super Bowl XL VI, including national broadcast, Patriots and Giants hometown broadcasts, and Spanish-language.

Happy to find that there's actually a broadcast from his favorite Giants' hometown broadcasters, he selects the third channel in the bank and enjoys listening to the game.

2.2 Discovery Use Cases

The following illustrate the use of Featured Favorites for content discovery.

2.2.1 Interesting Talk Topics

In early January, Shelly cycles through her preset banks noting that the Holiday Music bank is now gone, and a new bank called "New Year's Resolutions" appears with five channels:

81—Doctor Radio
111—Oprah Radio
110—Martha Stewart Living Radio

109—Cosmo Radio
107—SiriusXM Stars

Curious, she presses the "Info" button, reading:

SiriusXM wants to help you keep your new year's resolutions with advice from Oprah, Martha, Cosmo, Dr. Laura, and Doctor Radio experts.

Though she'd never heard of "Cosmo Radio", she tunes in and finds the discussion quite interesting. After some extended listening, she adds this channel to one of her own preset banks and finds it to be one of her favorite destinations when she wants to hear something other than music.

2.2.2 More Music Gems

Jeff finds nothing to catch his interest on his usual music channels, so he cycles through his banks to see what might be new in the Featured Favorites banks. There he finds a new bank called "Upbeat Music". One of the channels in this bank, "BPM", is new to him so he tunes in and is immediately hooked by a Deadmaus track. After some more listening, Jeff adds BPM as one of his own preset bank channels, adding more variety to his bank of favorite music channels.

3. Data Components

This section summarizes the data elements that are provided by the Module to the Host for supporting the product HMI for Featured Favorites. Section 4.1 below provides additional information regarding the flexible use of these data components for a variety of HMI implementation methods.

Each distinct list of channels provided by the Featured Favorites service is called a "bank".

Each bank is a list of channels (specified by a SID).

Each bank includes a name, which the HMI must display so the user will understand the general theme of the bank. Short (8 characters), medium (16 characters), and long (36 character) versions of names are supported.

Banks can be accompanied with text descriptions, up to 180 characters, for optional display by the HMI.

Multiple "Arrangements" of a given bank can be defined, to accommodate radios supporting different maximum numbers of presets per bank. Each Arrangement is a list of channels for that Bank with a maximum of 32 channels per Arrangement. Each Arrangement also includes presets-per-bank range values to specify the product class targeted by the Arrangement. A given product will only display at most one Arrangement from a bank, i.e., the Arrangement most closely matching that product's UI capabilities.

For example, a given bank could be supported with separate arrangements for products with maximum 5 presets per bank, maximum 6 presets per bank (typical for many OEM vehicles), maximum 10 presets per bank (many aftermarket and OEM products), or unlimited presets per bank (useful for products using unlimited length favorites lists instead of preset banks). Thus each bank Arrangement can be optimized by SiriusXM to include the channels and placement order best for different target product groups.

A maximum of 32 banks can be defined, each with up to 4 Arrangements. Note that this large number of banks allows SiriusXM to use the data service to provide channel lists for future purposes other than Featured Favorites; typically only 1 to 4 banks are simultaneously defined for the Featured Favorites use cases as described in this document.

Banks are prioritized, so that radios capable of showing fewer Featured Favorite banks than are currently being broadcast will show the subset of banks considered most important by Sirius XM.

4. Implementation Notes

The following provides insights into the software implementation tasks required of the product developer to support the Featured Favorites service, i.e., the related HMI software layer development tasks.

In general, the parsing of the data service providing Featured Favorites data is handled by the receiver Module, with the Host software responsible for using this data received from the Module to manage user interactions with the Featured Favorites banks or lists.

4.1 HMI Flexibility

The product designer may choose Featured Favorites elements that match the product's HMI capabilities, along the dimensions described below.

Presentation as Presets, Categories, or Lists—The product HMI may present the Featured Favorites banks as either:
  additional preset banks (e.g., on cycling past the user's preset banks, Featured Favorites banks begin appearing);
  as extensions to the SiriusXM Category lists (e.g., on cycling through SiriusXM's standard genre-based Categories, Featured Favorites banks appear as additional "special categories"); or
  as a dedicated set of Featured Favorites lists, accessed through an HMI method provided specifically for that purpose.
Of these methods, the preset bank presentation is recommended by SiriusXM, since this method also allows the product to easily apply other SiriusXM features such as Smart Favorites, Tune Start, and Tune Scan to the channels in a Featured Favorites bank when it is active. However, for a product where supporting additional preset banks is not practical, the alternative Category and dedicated lists methods are acceptable.

Number of Featured Favorites Banks to Display—The product HMI may be designed to show as few as one Featured Favorite bank, though display of at least 3 to 4 banks is recommended.

Number of Channels per Featured Favorites Bank to Display—The product HMI may limit the maximum number of channels displayed per Featured Favorite bank, matching the limits imposed by the product for user preset banks. For example, if the radio supports display of 8 channels per bank, it may simply ignore the last two channels of a 10-channel Featured Favorites bank.

Display of Featured Favorites Bank Name—All HMI implementations must be able to display the name assigned to a displayed Featured Favorites banks. Names are provided in 8, 16, and 32 character versions to accommodate different UI display capabilities.

Display of Featured Favorites Description Text—An HMI may provide a method for the user to view the descriptive text associated with a Featured Favorites (maximum 180 characters), but this is not required.

4.2 Host vs. Module Responsibilities

The Featured Favorites banks and data described in Section 3 above may be delivered to radios through a broadcast data service and processed by the Radio Module. The Module reports the Featured Favorites data to the Host as a Global Extended Metadata table through SXi messages from the Module to the Host. (It is therefore not necessary for the Host software to process the over-the-air bitstream used to transmit the Featured Favorites data.) This data includes versioning information so the Host can detect when changes to the Featured Favorites data have been made, and therefore when the Host's copy of this data should be updated.

Once the Feature Favorites data has been received from the Module by the Host, the Host determines which Featured Favorites banks are suitable for presentation to the user, and integrates them with the product's existing presentation of preset banks or favorites lists in a seamless manner.

In general, HMI management of Featured Favorites is similar to management of preset banks or lists (depending on how the product presents Featured Favorites), except the bank channels are pre-defined by SiriusXM instead of by the user, are assigned displayable names, and are accompanied by descriptive text for optional display.

The Host is responsible for requesting that the Module monitor the current version of Featured Favorites data at each power up and during operation to determine if any banks have been changed, added, or deleted, and modify the presented banks accordingly. Note that the Module supports methods for monitoring only changes in the Featured Favorites version number, so that the full Featured Favorites data need be requested from the Module only if there is a change indicated.

The Featured Favorites data used by the HMI must be stored in Host NVM so it is available immediately after each power-up.

5. Product Resource Requirements

This section provides guidelines for estimating the technical resources (bandwidth, product memory, etc.) required in a product to support the Featured Favorites service.

5.1 Data Storage Requirements

The Host is required to store the Featured Favorites data for the maximum number of Featured Favorites banks supported by the product in Host NVM. For estimation purposes, this requires about 100 bytes per bank for products not supporting display of Featured Favorites description text, and an additional 180 bytes per bank for products that do support the description text. Table 1 illustrates approximate NVM storage requirements for several implementation scenarios.

TABLE 1

NVM Estimates

| | Maximum Featured Favorites Banks Supported by Product | | | |
|---|---|---|---|---|
| | 1 | 2 | 3 | 4 |
| NVM without Description Text support (bytes) | 100 | 200 | 300 | 400 |
| NVM with Description Text Support (bytes) | 280 | 380 | 480 | 580 |

Even lower storage requirements can be achieved for products with limited HMI capabilities and very limited storage capacity with further optimizations, e.g., on order of 36 bytes total for a product supporting only one bank, maximum 6 presets per bank, and using 8 character bank names.

5.2 Processing Requirements

Host processing involves the following tasks, none of which require significant processor MIPs or RAM:
- Monitor for changes in the Featured Favorites data, through requests provided from the Host to the Module and indications provided from the Module to the Host.
- On report of changes in Featured Favorites data from the Module, request the Module to report the new Featured Favorites data, and in the Host determine which banks and Arrangements will be displayable by the product and incorporate the selected banks in the HMI presentation.
- When the user navigates to a Featured Favorites bank, display the channels in the bank in the same manner as used for user banks or channel lists, depending on the method adopted by the HMI.

5.3 Bandwidth Resources

Reception of broadcast data for Featured Favorites is managed entirely within the receiver Module. Therefore the product requires no incremental bandwidth resources to support Featured Favorites.

B. Featured Favorites User Interface Requirements

1. Introduction

Featured Favorites is an optional product feature that augments the product's channel presets or favorite channels feature.

The Featured Favorites service allows SiriusXM to broadcast additional banks (lists) of channels to be automatically added to the product preset banks or favorites lists, thus making it easier for the user to learn about and find channels.

Featured Favorite banks are dynamic. The SiriusXM broadcast continually transmits the data required for the product to display information about the current Features Favorites channels and banks.

Refer to the Featured Favorites Service Brief (Appendix A above) for more information about use cases of the Featured Favorites feature.

2. Scope

This User Interface Requirements and Recommendations (UIRR) document provides a specification of minimum User Interface requirements for products and applications that implement the SiriusXM Featured Favorites service.

The primary intended audience of this document is product User Interface developers adding the Featured Favorites service to an OEM or aftermarket/CE product.

Several factors were considered in the creation of this document. Among these factors are user safety, quick information conveyance, and simplistic user interaction.

Product design teams are encouraged to collaborate with SiriusXM product marketing, engineering, and Type Acceptance teams to adopt best practices that exceed the minimum required features and functionality giving the user the most enjoyable experience possible. Product design teams are also encouraged to progressively improve product features and functionality with successive product models and generations.

Product design teams are encouraged to consult with SiriusXM's engineering and product marketing teams to discuss advanced feature possibilities and capabilities and to confirm that proposed features and functionalities conform to the requirements of this and other SiriusXM requirement documents.

Portions of this document pertain to SiriusXM features that are not required to be implemented but if these optional features are implemented, the requirements specified apply to the optional feature.

The requirements in this document are broken up into multiple sections where some sections apply to all products implementing Featured Favorites and some requirements are not applicable if the associated sub-feature is not implemented.

Requirements are further separated into User Interface related requirements and others are related to implementation of the features that may not have an impact on the User Interface. Similar to the UI requirements, the implementation requirements are separated further in feature specific sections and applicability of a section depends on the feature/sub-feature implemented.

2.1 Limitations

This specification does not attempt to describe or constrain the implementation of other types of audio and/or data services and related features. Details about the implementation of other services and features may be referenced in this specification in order to provide descriptive clarity.

2.2 Precedence

For purposes of determining SiriusXM compatibility, this document has precedence over manufacturer's specifications and product drawings.

A product UI implementation is deemed SiriusXM compliant if it meets or exceeds the requirements contained in this document and the product passes the associated Type Acceptance tests designed to confirm compliance with these requirements.

4. Glossary/Acronyms

| Term | Description/Definition |
|---|---|
| Arrangement | In this document, Arrangement refers to a configuration of a Featured Favorites bank defined for products with a specific range of maximum presets per bank. Each Featured Favorites bank can support multiple "arrangements" to accommodate products with differing limits on the number of presets per bank. Refer to the SXi Extended Metadata Identifier (EMI) Assignments specification for more details about Arrangements. |
| Bank | See Favorites Bank. |
| Content | The music, talk shows, sporting events, and other audio programs transmitted on an audio channel. |
| Favorites | In this document, Favorites a synonym for presets. |
| Favorites Bank | A set of presets. A favorites bank may be a fixed number of channel presets, e.g., 6 channels for many OEM vehicles, 10 for some OEM and many aftermarket products, or a variable length scrollable list. Most products support multiple favorites or preset banks. |
| Host | In product architecture, the Host refers to processor and software provided by the product developer. The host controls a separate SiriusXM receiver Module using SXi. |
| Informative | Information provided for clarification or background, but not to be treated as formal testable requirements. (see also Normative) |
| Metadata | Data fields that describe the contents carried by a channel such as Song Title, Artist Name, and Song Tag. |
| Module | The Module refers to the SiriusXM receiver running SXi, controlled by the product Host. Examples include the X65H2 OEM Module and the SXV200 aftermarket Module. |
| must | Term used to define an action necessary for requirements compliance. |
| Normative | Information to be treated as formal testable requirements. (see also Informative) |
| NVM | Non-Volatile Memory such as Flash, EEPROM, or an HDD (hard drive). |
| PMAX | Maximum number of presets per bank or channels per favorites list supported by the product. Note that this value is a characteristic of the product independent of the Featured Favorites service. |
| Preset | A channel assigned to a hard or soft button or a list element in a product UI that allows the user to quickly select that channel with a simple action. |
| Preset Bank | Synonym for "Favorites Bank". |
| Product | A combination of components that together allow for the selection, reception, and control of the SiriusXM service, as well as the playing of the audio information and display of related text information, and/or processing of SiriusXM data services. A product may consist of multiple separate components, including but not limited to a fully integrated radio; an outboard tuner module and compatible head unit; an outboard tuner module with an FM, Bluetooth or similar retransmit tuner module and commander control/display unit; or a SiriusXM-Ready device connected by the user to a SiriusXM tuner module. |
| radio | Refers to the entire product, not necessarily one subcomponent of the product. |
| RAM | Volatile memory (random access memory). Data in RAM is lost when the product is powered off. This term is often used in contrast to NVM. |
| Reserved | Parameters that have no currently defined meaning. The functionality of these parameters may become defined in a future version of a protocol or API. |
| RMAX | Maximum number of presets for a bank arrangement. This field is provided with Featured Favorites data. |
| RMIN | Minimum number of presets for a bank arrangement. This field is provided with Featured Favorites data. |
| shall | Term used to define an action necessary for requirements compliance. |
| SID | Service Identifier. A unique fixed number assigned to every SiriusXM broadcast service. The SID of a channel is treated as a constant, with the associated user-visible Channel Number treated as metadata for the channel, and subject to change. |
| SID_LIST | A list of SIDs, identifying the channels in the bank, listed in the order they should be presented in the bank. |
| UI | User Interface |
| User Preset, User Favorites | A preset for which the user has selected the assigned channel (as opposed to a Featured Favorites where SiriusXM assigns a channel). |

5. Overview

To the user of a product that implements the Featured Favorites, the product appears to automatically present groups of SiriusXM channels that are periodically changed to different channels.

The means of presenting the Featured Favorites channels to the user is typically consistent with the means that the product implements channel presets or favorite channels but alternative presentation methods are acceptable. Some of the potential means to present the Featured Favorites banks and channels include, but are not limited to, the following:

- A product with a "bank" or "band" button to cycle through channel preset banks can add the Featured Favorites as additional banks after the user-defined preset banks.
- A product that provides user Favorite channels as an extension to Category navigation may add the Featured Favorites banks as additional "category" lists following the user-defined Favorite channels list.
- A product that provides a scrollable list of user-named favorites lists may add the names of the Featured Favorites banks to the end of the list. Alternatively the product may provide a higher level navigation method allowing the user to expand either a list of user presets or Featured Favorites.

Featured Favorites banks are dynamic: they can be defined, added and removed from the broadcast at any time, to correspond to the programming objectives of SiriusXM.

5.1 Featured Favorites Data Components

This section summarizes the data elements that are provided by the Module to the Host for supporting the product UI for Featured Favorites.

Section 5.2 provides additional information regarding the flexible use of these data components for a variety of HMI implementation methods.

Each distinct list of channels provided by the Featured Favorites service is called a "bank", regardless of how the Featured Favorites are implemented on the user interface. Characteristics of the Banks include:

- Each bank is a list of channels (specified by SID).
- Each bank includes a title, which the product UI must display so the user will understand the general theme of the bank. Different lengths of the bank titles are available to support different product display capabilities: Short (max 8 characters), Long (max 16 characters), and Verbose (max 36 character). (Note that the longer Bank Titles may not be included for some banks and the product is to use the next shorter available version in those cases.)
- Banks can be accompanied with Bank Descriptions, up to 180 characters, for optional display by the product.
- Banks have associated "Bank Arrangements". A Bank Arrangement is an ordered set of channels for a bank, along with constraints on the number of presets per bank that must be supported by a product for that product to use the Arrangement.
  - Each Bank may have between one and four Arrangements to accommodate different product preset bank sizes (channel per bank).
  - Each Arrangement is an ordered list of channels with a maximum of 32 channels.
  - Each Arrangement includes parameters that define the presets-per-bank range values to specify the product class targeted by the Arrangement.
- A given product will only display at most one Arrangement from a bank, i.e., the Arrangement most closely matching that product's UI capabilities.
  For example, a bank could have four different Arrangements targeting products with:
    a, maximum 5 presets per bank,
    b, maximum 6 presets per bank (typical for many OEM vehicles),
    c, maximum 10 presets per bank (many aftermarket and OEM products), or
    d, unlimited presets per bank (useful for products using unlimited length favorites lists instead of preset banks).
  Thus each bank Arrangement can be optimized by SiriusXM to include the channels and placement order best for different target product groups.
- A maximum of 32 banks can be defined, each with up to 4 Arrangements per Bank.
  Note that this large number of banks allows SiriusXM to use the associated data service to provide channel lists for future purposes other than Featured Favorites.
  Typically only 1 to 4 banks are simultaneously defined for the Featured Favorites use cases as described in this document.
- Banks are prioritized so that products will show the subset of banks considered most important by Sirius XM when the number of Featured Favorite banks being broadcast exceeds the number of banks supported by the product.
- Banks have an associated Bank Purpose parameter to define if the Bank definition supports features supported by the product. The Bank Purpose parameter is a bitfield with one of the bit designed as "Convenience". The product using Featured Favorites data only for the Featured Favorites service should ignore a bank if the Convenience bit of the Featured Favorites Bank Purpose is not set.
  The Featured Favorites data components are delivered from the SXM tuner module to the Host as Global Metadata elements (for products that do not use SMS) and by corresponding Featured Favorites methods for products using SMS.

5.2 Featured Favorites User Interface Flexibility

The UI requirements for Featured Favorites give the product designer flexibility in implementing the feature to match the product's user interface capabilities in the following aspects:

Presentation as Presets, Categories, or Lists—The product may present the Featured Favorites banks using one of the following options:
  additional preset banks, appending the Featured Favorite banks to the list/cycle of user defined channel preset banks; or
  as extensions to the SiriusXM Category lists, treating the Featured Favorite banks as virtual categories appended to the list of SiriusXM broadcast defined category lists; or
  as a dedicated set of Featured Favorites lists, accessed through an UI method provided specifically for that purpose.
    NOTE: Of these options, SiriusXM recommends the first option, preset bank presentation, because this method allows the product to easily apply other SiriusXM features such as Smart Favorites, Tune Start, and Tune Scan to the channels in a Featured Favorites bank when it is active. Where supporting additional preset banks is not practical in a product design, the alternative Category and dedicated lists methods are acceptable.

Number of Featured Favorites Banks to Display—The product UI may be designed to show as few as one Featured Favorite bank, but SiriusXM recommends that at least 3 Featured Favorite banks be supported.

Number of Channels per Featured Favorites Bank to Display—The product UI may limit the maximum number of channels displayed per Featured Favorite bank to be consistent with user-defined preset banks. For example, if the product supports display of 8 channels per user-defined preset bank, the product may ignore channels past the eighth channel in Featured Favorite Bank Arrangements that contain more than 8 channels.

Display of Featured Favorites Bank Title—All product UI implementations must display the Title associated with a Featured Favorites banks but the different lengths of the Bank Titles are available to accommodate product display size limitations. The Bank Titles are provided in 8, 16, and 32 character versions.

Display of Featured Favorites Description Text—A product UI may provide a method for the user to view the descriptive text associated with a Featured Favorites (maximum 180 characters), but this is not required.

6. Requirements 6.1 Featured Favorites General Requirements

This set of requirements applies to all products implementing Featured Favorites.

TABLE 1

Featured Favorites General Requirements

| Requirement ID | Requirement Description |
| --- | --- |
| FeaturedFav_Gen_001 | Products shall describe the Featured Favorites feature in user manuals using terminology and guidance provided by SiriusXM. |

6.2 Featured Favorites UI Requirements

TABLE 2

Featured Favorites UI Requirements

| Requirement ID | Requirement Description |
| --- | --- |
| FeaturedFav_001 | Products shall support display of at least one Featured Favorites bank using one of the following options:<br>a. as additional preset banks, appending the Featured Favorite banks to the list/cycle of user defined channel preset banks;<br>b. as extensions to the SiriusXM Category lists, treating the Featured Favorite banks as virtual categories appended to the list of SiriusXM broadcast defined category lists;<br>c. as a dedicated set of Featured Favorites lists, accessed through an UI method provided specifically for that purpose;<br>d. in an alternative fashion pre-approved by SiriusXM. |
| FeaturedFav_002 | Products shall display the Bank Title for each displayed Featured Favorites bank. |
| FeaturedFav_003 | Products implementing Featured Favorites as preset banks shall either:<br>a. display the Bank Title for 3-5 seconds when the user selects and/or cycles through the preset banks. OR<br>b. display the Bank Title persistently while the bank is selected. |
| FeaturedFav_004 | Products shall use the longest Bank Title text string option for the display space allocated for the Bank Title.<br>Note: Bank Title text strings are available in 8, 16, and 36-characters max length. |
| FeaturedFav_005 | Products shall provide a means for the user to distinguish Featured Favorites banks versus user-defined preset banks and category lists using a prefix with the Bank Title with one of the following text strings:<br>a. "SXM Featured Favorites - " or<br>b. "Featured Favorites - " or<br>c. "SXM Featured - " or<br>d. "Featured - " OR<br>e. using some other indication approved by SiriusXM<br>Note: Example of prefix usage: "SXM Featured Favorites - Holiday Music" |
| FeaturedFav_006 | Products that implement an option to display the optional Bank Description text strings shall:<br>a. show the correct Bank Description text string for the selected Featured Favorites Bank, AND<br>b. not truncate the Bank Description text string reported by the SXM tuner module.<br>Note: Scrolling or paging of the Bank Description text string is permitted.<br>Note: Max length of Bank Description text string is 180 characters. |
| FeaturedFav_007 | Products shall display the channels in Featured Favorites banks using the order defined in the associated Featured Favorites Bank Arrangement parameter. |
| FeaturedFav_008 | Product shall handle channels in the Featured Favorites banks consistent with the product's handling of channels in user favorites or preset banks with respect to, but not limited to:<br>a. display of channel name, channel number, channel logo and other channel related metadata and artwork.<br>b. tuning behaviors and display of appropriate user advisory messages.<br>c. replay related behaviors including Smart Favorites, TuneStart, TuneScan and TuneMix, if supported. |

TABLE 2-continued

Featured Favorites UI Requirements

| Requirement ID | Requirement Description |
|---|---|
| FeaturedFav_009 | Products that implement Featured Favorites as presets shall treat the 'extra' preset positions as empty when the most applicable Featured Favorites Bank Arrangement for a bank contains fewer channels than are supported by the product preset bank.<br>Note: For example:, if the product supports 10 presets per bank and the most applicable Featured Favorites Bank Arrangement for a Featured Favorites bank defines only 6-channels, presets 7-10 in that preset banks shall be treated as empty.<br>Note: The most applicable Featured Favorites Bank Arrangement for a bank is defined by implementation logic found in Section 6.3 |
| FeaturedFav_010 | Products shall prevent the user from adding or deleting channels in a Featured Favorites bank. |
| FeaturedFav_011 | Products shall update the Featured Favorites banks and associated channels and data within 10 seconds of the SXM tuner module reporting a change to the Featured Favorites data.<br>The product may defer making the changes until the selected Featured Favorites bank is not selected, if the product is displaying a Featured Favorites bank when an update is reported, |
| FeaturedFav_012 | If, as a result of a broadcast update, a Featured Favorite bank becomes deleted while the bank is selected, the Product shall defer deleting the bank and keep the bank selected until the user either switches to a different bank or powers down the radio, after which the deleted bank shall no longer be displayed or selectable. |
| FeaturedFav_013 | Products shall handle the situation when the maximum number of Featured Favorites banks that can be displayed by the product exceeds the Featured Favorites bank that are defined by the service or that meet the product's criteria for display.<br>Note: For example, the product can display only those banks that have Featured Favorites data available. |
| FeaturedFav_014 | Products shall provide an indication when a change in the displayed Featured Favorites banks is detected where the indication is an icon, or a user message, or similar.<br>Note: Examples of user messages include but are not limited to: "SXM Featured Favorites Updated", or "Favs Upd" or similar. SiriusXM recommends, where possible, that the indication be accompanied by a shortcut method to access at least one of the updated Featured Favorites banks. |
| FeaturedFav_015 | Products that implement a user message to report a change in Featured Favorites banks shall include a menu option to disable the Featured Favorites update user messages. Products shall maintain this user setting in NVM and set the option to enable the messages by default. |
| FeaturedFav_016 | On products that include a user option to disable Featured Favorites functionality, the option shall be persistent across normal power cycles and the option shall default to 'enabled' upon factory default.<br>Note: Products are permitted, but not required, to provide a user option to disable Featured Favorites functionality. |

6.3 Featured Favorites Implementation Requirements

The requirements in this section are related to implementation aspects of the Featured Favorites that are not directly related to the User Interface.

Note, for products based on SMS, most of these requirements are handled automatically by the SMS Featured Favorites service.

Some of these requirements refer to Featured Favorites parameters described in the SXi Implementation Guide, and the SXi Extended Metadata Identifier (EMI) Assignments document.

TABLE 3

6.2 Featured Favorites Implementation Requirements

| Requirement ID | Requirement Description |
|---|---|
| FeaturedFav_Imp_001 | Products shall store all Featured Favorites data in non-volatile, such that the data is preserved across normal power cycles.<br>Note: Normal power cycles are those which a user would be expected to perform during typical product operation. |
| FeaturedFav_Imp_002 | Products shall clear all stored Featured Favorites data on a product Engineering Factory Default Reset. |

TABLE 3-continued

6.2 Featured Favorites Implementation Requirements

| Requirement ID | Requirement Description |
| --- | --- |
| FeaturedFav_Imp_003 | Products shall select the first Arrangement per Featured Favorites bank that meets the selection criteria defined in the implementation requirements. |
| FeaturedFav_Imp_004 | Products shall reject an Arrangement if RMAX is zero. |
| FeaturedFav_Imp_005 | Products shall reject an Arrangement if RMAX is less than PMAX, unless RMAX is 1023, in which case no maximum applies. |
| FeaturedFav_Imp_006 | Products shall reject an Arrangement if RMIN is greater than PMAX. |
| FeaturedFav_Imp_007 | Products shall reject a Bank if the Convenience bit of the Bank Purpose field provided by the module is not asserted. |
| FeaturedFav_Imp_008 | Products shall ignore a Bank if no Arrangements for a bank meet the product's selection criteria as defined by the other implementation requirements.<br>Note: Ignored banks are not displayed. |
| FeaturedFav_Imp_009 | Products limited to displaying n Featured Favorites banks shall ignore all banks in the Featured Favorites list after the first n banks with an Arrangement matching the product's presets per bank capability, with the bank priority defined by the Bank Order field.<br>Note: Banks are prioritized, so that radios capable of showing fewer Featured Favorites banks than are currently being broadcast will show the subset of banks considered most important by SiriusXM. |
| FeaturedFav_Imp_010 | Products shall store all channels of all preset banks with SID value and the SID value shall be used to direct the Module to tune to the channel if the user selects the corresponding preset. |
| FeaturedFav_Imp_011 | Products shall display the list of channels in the bank in the order specified in the Arrangement SID_LIST. |

[End of Appendices A and B]

FIGS. 24-30: Additional User Interface Examples

With reference to FIGS. 24-30, next described are some additional examples of Featured Favorites implemented using Preset Banks and using a Favorite Channel list.

Figure 24:
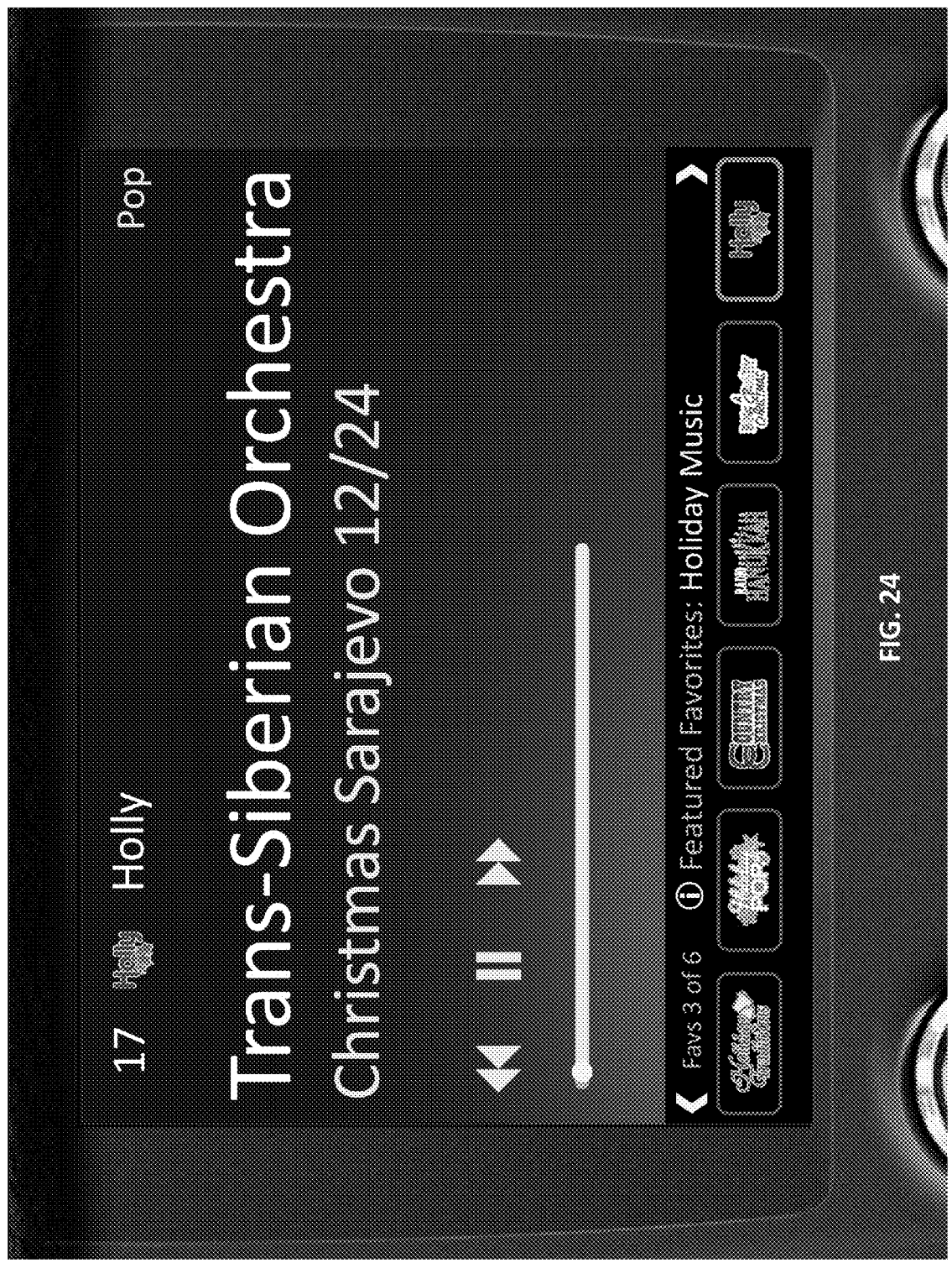
FIGS. 24-30 depict additional exemplary user interfaces for navigating broadcast or streamed content in accordance with exemplary embodiments of the present invention.

FIG. 24 shows an example User Interface with Featured Favorites implemented as Preset Banks shown at the bottom of the screen shot. In this example, the "Holiday Music" Featured Favorites bank is displayed, where "Holiday Music" is the 'Bank Title'. The Bank Title is prefixed with "Featured Favorites:" to distinguish it from normal presets.

Figure 25:
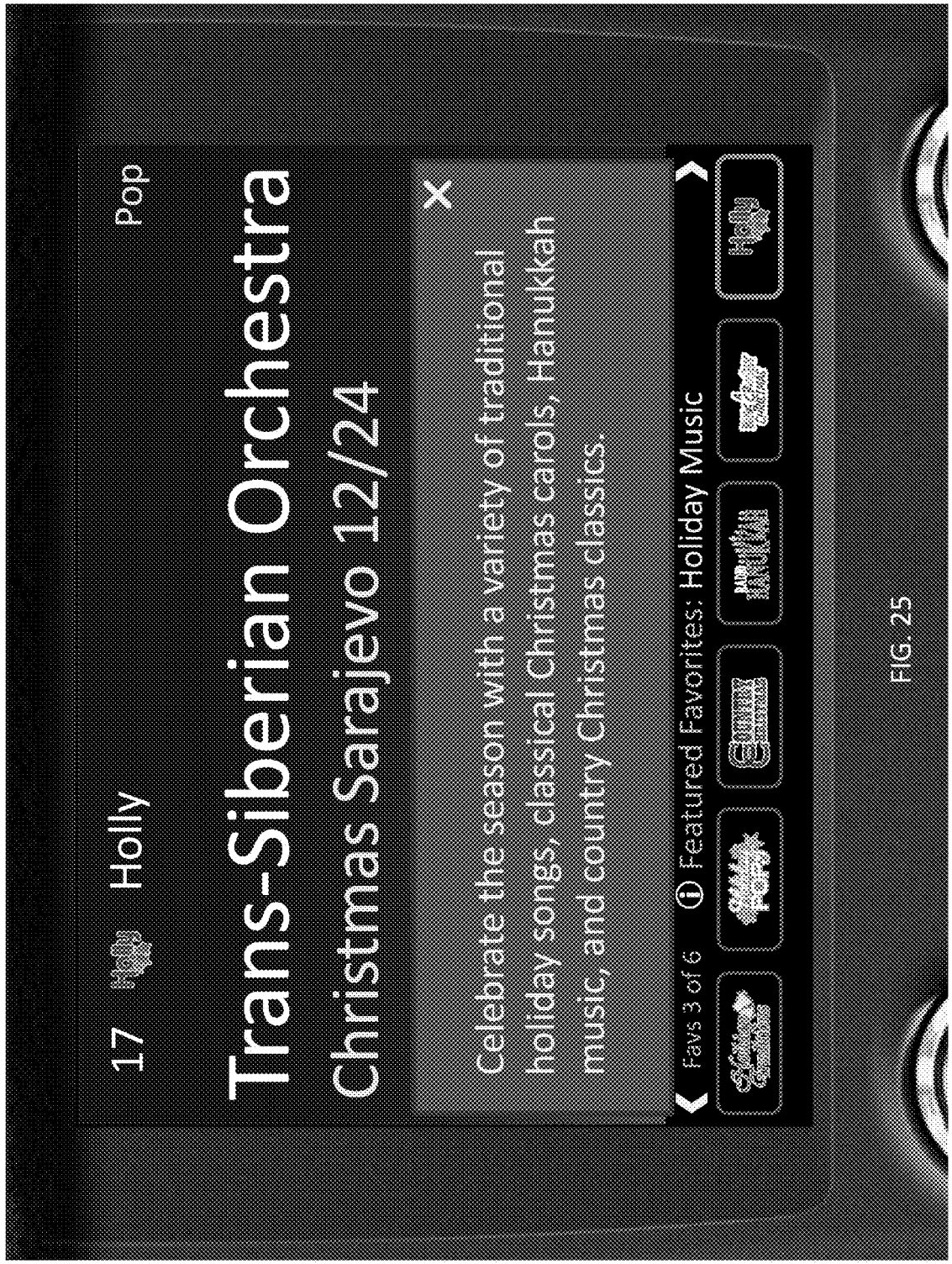

An "information" icon control is also provided to give user access to the associated Featured Favorites Description Text. FIG. 25 shows an example of the associated Featured Favorites Description Text displayed as a pop-up display: "Celebrate the season with a variety of traditional holiday songs, classical Christmas carols, Hanukkah music, and country Christmas classics."

Figure 26:
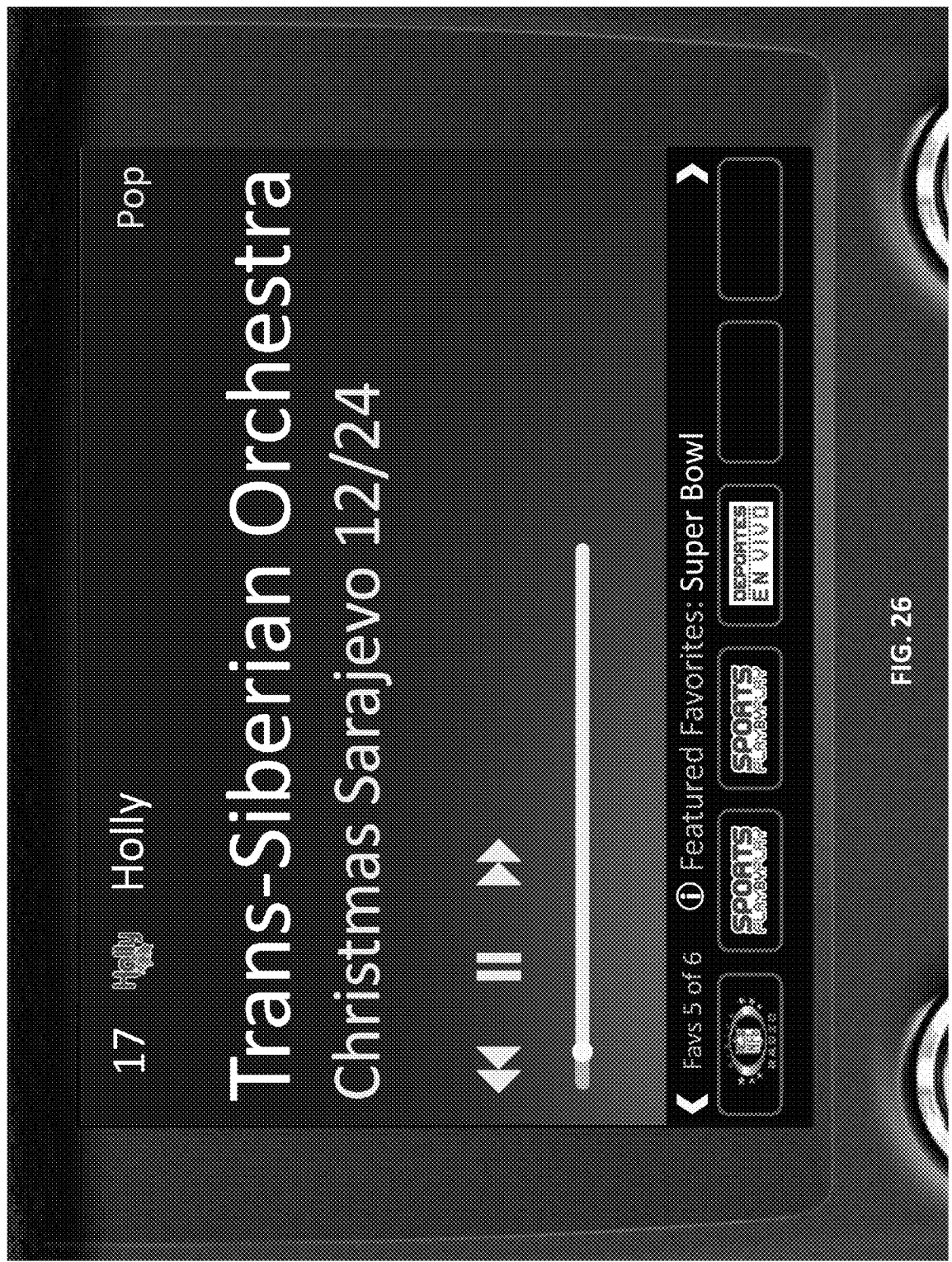
Figure 27:
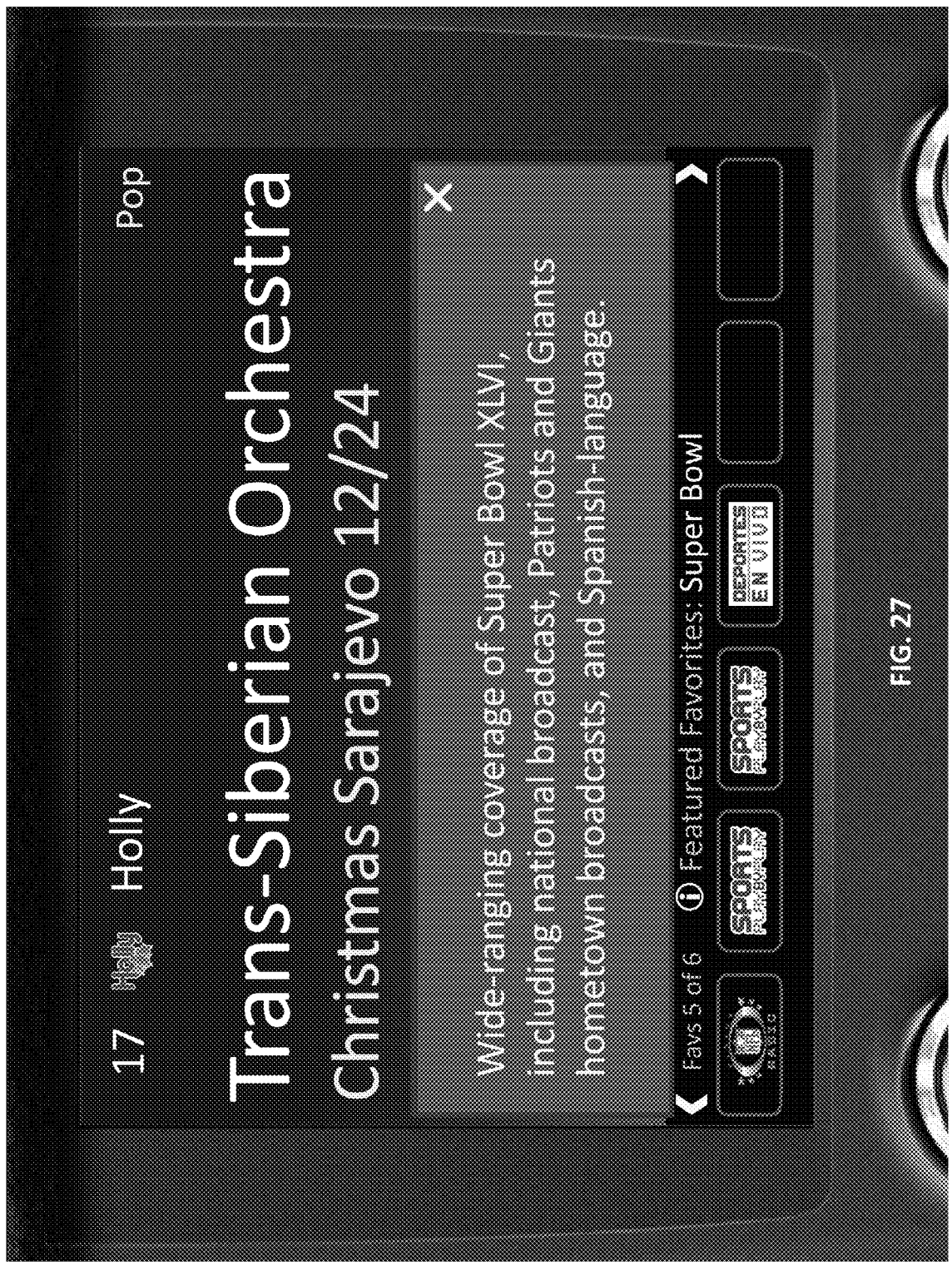

FIGS. 26 and 27 depict a user listening to a song ("Christmas Sarajevo 12/24") on Channel 17 "Holly", and thus seeing the regular listening screen. FIG. 26 shows a featured favorite "Super Bowl" and FIG. 27 shows the effect of the user pressing the information button lower case "i" in a circle) to see the description of this new Featured Favorite, all while remaining tuned to Channel 17. It is noted, as shown in FIG. 29, that Channel 17 "Holly" is also part of the Featured Favorite "Holiday Music."

Figure 28:
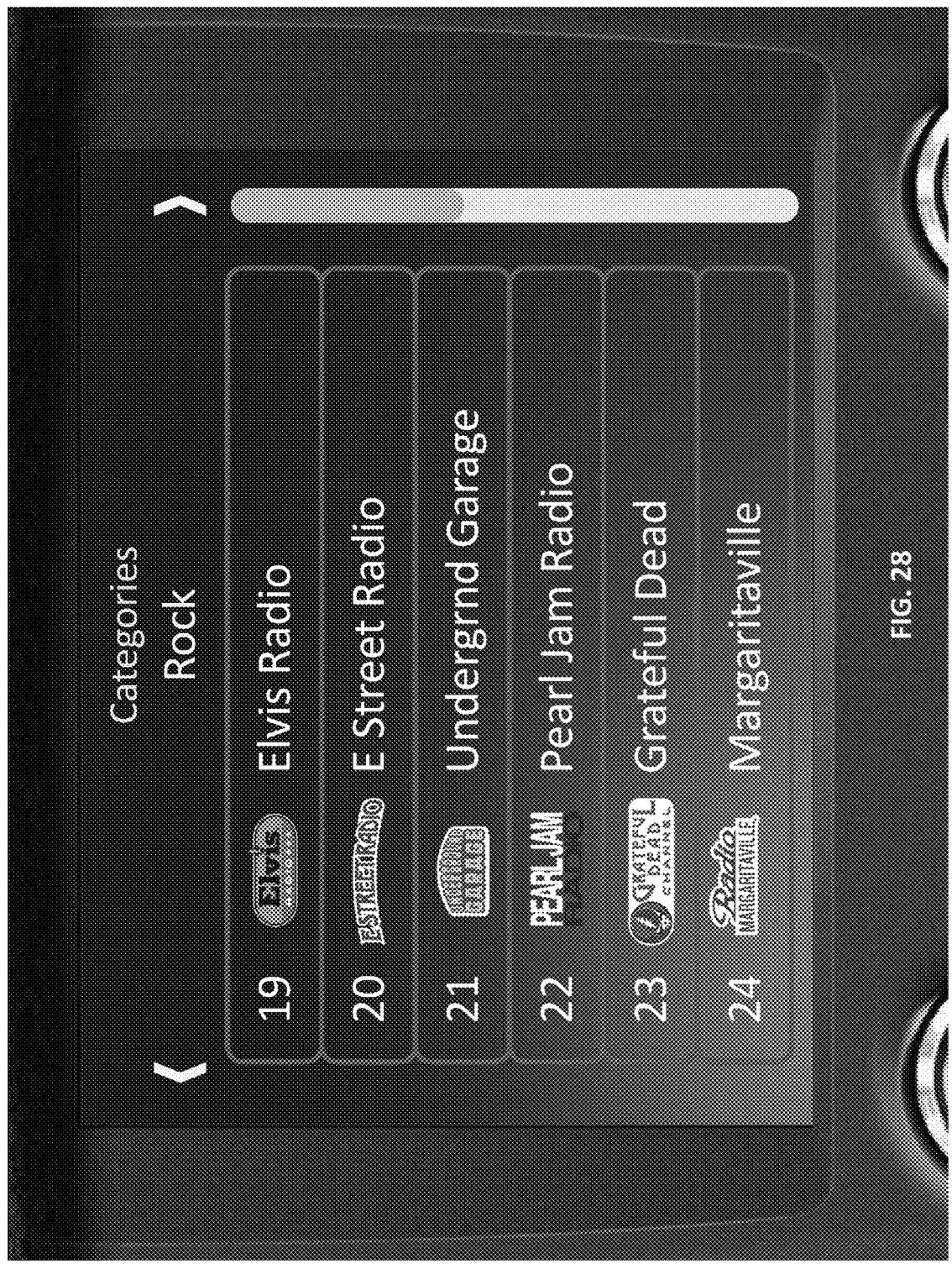
Figure 29:
Figure 30:

FIGS. 28-30 show conventional favorites under the Rock category, as well as two screens which feature Featured Favorites, namely "Holiday Music" and "New Year's Resolutions", as described above.

Interplay Between Featured Favorites and "Tune Mix" Technology

In exemplary embodiments of the present invention, a Featured Favorite operation can also include Tune Mix™ support. Tune Mix™ functionality is described in U.S. patent application Ser. No. 13/531,440, now published as US 2013/003993, and is hereby fully incorporated herein by reference as if fully set forth. Tune Mix™ functionality is referred to as "Mix Channels" in the application. TuneMix™ functionality is directed to methods and apparatus for generating a personalized radio channel playlist by simultaneously buffering multiple received channels from one or more source streams, and then selecting songs or tracks to playback from the buffered channels. Users can specify favorite channels for building their personal playlists, or multiple default playlist channels can be provided by genre or channels related in some other way. Navigation tools permit users to skip ahead and backward in the playback stream. A personalized radio channel playlist can be implemented as (1) content selected from buffered channels based on user preferences for artists, songs and the like, or (2) as a Mix Channel in which content from selected buffered channels is automatically mixed for playback in response to selection of a preset button assigned to the Mix Channel.

In exemplary embodiments of the present invention, an exemplary Featured Favorites data transmission service can be used to support TuneMix™ in the following manner. An exemplary Featured Favorites service can be used to transmit a list of channels which, when received by the receiver, can be used to construct a Tune Mix™ channel comprising the channels in the list. This can be done, for example, using a bitfield called "Purpose" associated with each transmitted channel list in Featured Favorites. For example, one bit can represent "Convenience", meaning that the list is to be displayed as a Featured Favorites bank from which the user can conveniently access the channels in the list (already covered in the FF patent application). In addition, an exemplary system may furthermore designate a separate bit in the Purpose field to mean "Tune Mix™", meaning the receiver should instead use the channel list to construct a Tune Mix™ channel.

An exemplary Featured Favorites service can also optionally include a Channel ID with the list, so that the constructed Tune Mix™ channel receives a "viritual channel ID" so that it can then be tuned just like a normal broadcast channel by the user.

Exemplary Systems

In exemplary embodiments of the present invention, any suitable programming language can be used to implement the routines of particular embodiments including C, C++, Java, JavaScript, Python, Ruby, CoffeeScript, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time Particular embodiments may be implemented in a computer-readable storage device or non-transitory computer readable medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/Figs. can also be implemented in a more separated or integrated manner, or even removed or rendered as inoperable in certain cases, as is useful in accordance with a particular application. It is also within the spirit and scope to implement a program or code that can be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above-presented description and figures are intended by way of example only and are not intended to limit the present invention in any way except as set forth in the following claims. It is particularly noted that persons skilled in the art can readily combine the various technical aspects of the various elements of the various exemplary embodiments that have been described above in numerous other ways, all of which are considered to be within the scope of the invention.

What is claimed:

1. A method of receiving transmitted content, comprising:
receiving at a receiver a plurality of program channels from at least one transmitted content stream;
receiving data from said content stream, said data including one or more dynamically updated banks, each of the dynamically updated banks defining a dynamically updated subset of said plurality of program channels and including information for one or more receiver capabilities required to display the respective dynamically updated bank;
determining, from the dynamically updated banks, one or more displayable banks that can be displayed by the receiver based at least in part on the information; and
displaying at least one of the displayable banks on a user interface of the receiver to a user.

2. The method of claim 1, wherein the determining includes checking a bank display capacity of the receiver against the information and user preferences.

3. The method of claim 2, wherein said user preferences include one or more of user designation of a channel as a favorite, user profile, user listening history and user demographics.

4. The method of claim 1, further comprising storing a received content of a designated channel from the displaying bank in a buffer, and further comprising:
receiving a command to initiate a scan function;
in response to the command, scanning the subset of said plurality of program channels of the displaying bank by successively playing a selected amount of content for each channel in the subset; and
if a scanned channel is a designated channel:
playing back a selected amount of corresponding content in the buffer from a selected play point.

5. The method of claim 2, further comprising storing a received content of a designated channel from the displaying bank in a buffer, and further comprising:
receiving a command to initiate a scan function;
in response to the command, scanning the subset of said plurality of program channels of the displaying bank by successively playing a selected amount of content for each channel in the subset; and
if a scanned channel is a designated channel:
playing back a selected amount of corresponding content in the buffer from a selected play point.

6. The method of claim 1, wherein the at least one transmitted content stream includes at least one of a wireless transmission, a wireline transmission, a radio program communication, a television program communication, a cable television program communication, streaming via the internet, digital audio broadcast (DAB), a unicast, a multicast, a broadcast, a cellular commumcatl on, and a satellite communication.

7. The method of claim 1, wherein:
the plurality of program channels are dynamically updated to include a seasonally available channel;
at least one of the dynamically updated banks is updated to include the seasonally available channel; and
displaying the seasonally available channel.

8. The method of claim 1, wherein the displaying includes displaying a number of channels in the displayable bank based on display capabilities of the receiver.

9. The method of claim 1, further comprising generating a mix channel from the channels in at least one of said groupings.

10. The method of claim 1, wherein each of the dynamically updated banks further includes a plurality of different arrangements, each of the arrangements having different receiver information to allow receivers having different capabilities to display the respective bank; the method further includes:
determining from one of the displayable banks a displayable arrangement that can be displayed by the receiver based at least in part on the receiver information; and displaying the displayable arrangement on the user interface.

11. The method of claim 1, further comprising ignoring any dynamically updated banks that cannot be displayed based at least in part on the information.

12. Apparatus for receiving and displaying banks of channels, comprising:
a channel decoder, the channel decoder being arranged to decode a plurality of program channels from at least one transmitted content stream, wherein said content stream includes data on one or more dynamically updated banks, each of the dynamically updated banks defining a dynamically updated subset of said plurality of program channels and including information for one or more receiver capabilities required to display the respective dynamically updated bank;
a system controller in communication with the channel decode, the system controller being configured to determine from, the dynamically updated banks, one or more displayable banks that can be displayed by the receiver based at least in part on the information;
a memory in communication with the system controller; and
a user interface in communication with the system controller, the user interface being configured to display at least one of the displayable banks.

13. The apparatus of claim 12, wherein the system controller in response to a directive designating one or more of the displayable banks for buffering, stores content of each designated channel in the memory; and
wherein the system controller, in response to user input, changes a currently tuned channel to a different channel of the displayable bank being displayed.

14. The apparatus of claim 13, wherein the memory comprises one or more buffers.

15. The apparatus of claim 12, wherein the system controller, in response to user input, scans the bank being displayed by successively playing a selected amount of content for each channel in the subset.

16. The apparatus of claim 15, wherein at least one of:
the memory comprises one or more buffers,
the selected play point is determined based on configuration data provided for respective ones of the designated channels,
if a scanned channel is not a designated channel, then playing a selected amount of the live content of that channel currently being received, and
the system controller scanning of at least a subset of the designated channels comprises:
(a) playing a portion of the oldest track in each of the scanned designated channels,
(b) playing a portion of the next oldest track in each of the scanned designated channels,
(c) repeating (b) until the newest stored track in each of the scanned designated channels is played,
(d) playing a current play point in the currently received track corresponding to each of the scanned designated channels, and
(e) repeating any of (a) through (d), as to any content not yet played, until scanning is stopped.

17. The apparatus of claim 15, further comprising during the play back of a selected amount of a designated channel, the system controller implementing at least one of fast forward, pause, resume, rewind, skip track forward, skip track backward and skip to live playback of the channel, in response to user input.

18. A non-transitory computer readable medium containing instructions that, when executed by at least one processor of a computing device, cause the computing device to:
receive at a receiver a plurality of program channels from at least one transmitted content stream;
receive data from said content stream, including one or more dynamically updated banks, each of the dynamically updated banks defining a dynamically updated subset of said plurality of program channels and including information for one or more receiver capabilities required to display the respective dynamically updated bank;
determining, from the dynamically updated banks, one or more displayable banks that can be displayed by the receiver based at least in part on the information; and
displaying at least one of the displayable banks on a user interface of the receiver to a user.

19. The non-transitory computer readable medium of claim 18, wherein the determining includes checking a bank display capacity of the receiver against the information and user preferences.

20. The non-transitory computer readable medium of claim 18, wherein, pursuant to said instructions:
the receiver:
stores a received content of a designated channel from the displaying bank in a buffer;
receives a command to initiate a scan function; and
in response to the command, scans the subset of the plurality of program channels of the displaying bank by successively playing a selected amount of content for each channel in the subset;
wherein, if a scanned channel is a designated channel, playing back a selected amount of corresponding content in the buffer from a selected play point.

* * * * *